United States Patent
Hayashi

(10) Patent No.: US 10,380,416 B2
(45) Date of Patent: Aug. 13, 2019

(54) DATE IDENTIFYING APPARATUS, DATE IDENTIFYING METHOD, AND COMPUTER-READABLE RECORDING MEDIUM

(71) Applicant: PFU Limited, Ishikawa (JP)

(72) Inventor: Masayoshi Hayashi, Ishikawa (JP)

(73) Assignee: PFU Limited, Ishikawa (JP)

( * ) Notice: Subject to any disclaimer, the term of this patent is extended or adjusted under 35 U.S.C. 154(b) by 196 days.

(21) Appl. No.: 15/606,250

(22) Filed: May 26, 2017

(65) Prior Publication Data
US 2018/0232884 A1    Aug. 16, 2018

(30) Foreign Application Priority Data

Feb. 14, 2017    (JP) .................................. 2017-025261

(51) Int. Cl.
*G06K 9/34* (2006.01)
*G06K 9/00* (2006.01)
(Continued)

(52) U.S. Cl.
CPC ......... *G06K 9/00456* (2013.01); *G06K 9/344* (2013.01); *G06K 9/4604* (2013.01); *G06K 9/72* (2013.01)

(58) Field of Classification Search
CPC ......... G06K 2209/01; G06K 2209/011; G06K 9/00442; G06K 9/03; G06K 9/036;
(Continued)

(56) References Cited

U.S. PATENT DOCUMENTS

| 6,029,144 A * | 2/2000 | Barrett | G06Q 99/00 |
| | | | 235/375 |
| 6,816,620 B2 * | 11/2004 | Enomoto | H04N 1/00068 |
| | | | 382/167 |

(Continued)

FOREIGN PATENT DOCUMENTS

| JP | H08-221512 A | 8/1996 | |
| JP | 09305709 | * 11/1997 | .............. G06K 9/38 |

(Continued)

OTHER PUBLICATIONS

A Robust Algorithm for Text Detection in Images, Julinda Gllavata et al., Proc. ISPA03, 2003, pp. 611-616 (Year: 2003).*

(Continued)

*Primary Examiner* — Jayesh A Patel
(74) *Attorney, Agent, or Firm* — McDermott Will & Emery LLP

(57) ABSTRACT

A date identifying apparatus includes a segmenting unit that segments date area data, the date area data being data of an area to which a date is estimated to be provided, from image data generated by capturing a medium to which the date is provided, a binarizing unit that executes a binarizing process for binarizing the date area data to generate binarized data, an identification unit that executes an identifying process for executing a recognizing process using deep learning on the binarized data to identify a character string included in the date area data, a correction unit that executes a correcting process according to a kind of a font of the character string on an identified result of the identifying process, and a provision unit that provides, to the image data, date data based on a character string included in the corrected identified result.

5 Claims, 17 Drawing Sheets

(51) Int. Cl.
*G06K 9/46* (2006.01)
*G06K 9/72* (2006.01)

(58) Field of Classification Search
CPC ........ G06K 9/2054; G06K 9/00; G06K 9/186;
G06K 9/344; G06K 9/3258; G06K 9/348;
H04N 1/56; G06T 11/001; G06T 11/60
See application file for complete search history.

(56) References Cited

U.S. PATENT DOCUMENTS

| | | | | |
|---|---|---|---|---|
| 8,046,308 | B2* | 10/2011 | Miette | G06Q 10/083 705/337 |
| 9,311,531 | B2 | 4/2016 | Amtrup et al. | |
| 9,355,312 | B2* | 5/2016 | Amtrup | G06K 9/00469 |
| 9,594,985 | B2 | 3/2017 | Murphy et al. | |
| 9,646,218 | B2 | 5/2017 | Takahashi | |
| 9,754,164 | B2 | 9/2017 | Macciola et al. | |
| 10,242,285 | B2* | 3/2019 | Thrasher | G06T 7/187 |
| 2009/0132610 | A1* | 5/2009 | Bedingfield, Sr. | G06F 16/489 |
| 2009/0240800 | A1* | 9/2009 | Yee | G06F 21/83 709/224 |
| 2010/0092329 | A1* | 4/2010 | Branagan | C22C 1/002 420/14 |
| 2011/0063468 | A1* | 3/2011 | Ahn | G06K 9/3258 348/222.1 |
| 2011/0103688 | A1* | 5/2011 | Urbschat | G06K 9/03 382/182 |
| 2011/0249905 | A1* | 10/2011 | Singh | G06K 9/00449 382/225 |
| 2012/0250989 | A1* | 10/2012 | Asano | G06K 9/348 382/165 |
| 2013/0027430 | A1* | 1/2013 | Matsuda | G06F 3/011 345/633 |
| 2013/0279759 | A1* | 10/2013 | Kagarlitsky | G06K 9/6202 382/105 |
| 2014/0270536 | A1 | 9/2014 | Amtrup et al. | |
| 2015/0339526 | A1 | 11/2015 | Macciola et al. | |
| 2016/0028921 | A1* | 1/2016 | Thrasher | H04N 1/4092 358/519 |
| 2016/0275378 | A1 | 9/2016 | Hayashi | |
| 2016/0371557 | A1 | 12/2016 | Takahashi | |

FOREIGN PATENT DOCUMENTS

| | | | |
|---|---|---|---|
| JP | 09305709 A | * | 11/1997 |
| JP | H09-326012 A | | 12/1997 |
| JP | 2000-339472 A | | 12/2000 |
| JP | 2013-084071 A | | 5/2013 |
| JP | 2016-517587 A | | 6/2016 |
| JP | 2016-177383 A | | 10/2016 |
| JP | 2016-177655 A | | 10/2016 |
| JP | 2017-010170 A | | 1/2017 |
| WO | 2014/160426 A1 | | 10/2014 |

OTHER PUBLICATIONS

Japanese Office Action dated Feb. 13, 2018 issued in Japanese Patent Application No. 2017-025261 (with English translation).
H. Yatsuyanagi, et al., "Consideration of technique of detecting specific character region in product package," 22nd Symposium on Sensing Via Image Information, SSII 2016, Japan, Society of Sensing Via Image Information, 2016, IS3-12 (with English translation).

* cited by examiner

FIG.27

2002/08112 —CORRECT→ 2002/08/12
       P5  P8                    P5  P8

FIG.28

2002/08712 —CORRECT→ 2002/08/12
       P5  P8                    P5  P8

FIG.29

2002108112 —CORRECT→ 2002/08/12
       P5  P8                    P5  P8

FIG.30

0045月248 —CORRECT→ 00年5月24日
  P3  P5   P8             P3  P5  P8

00年58248 —CORRECT→ 00年5月24日
 /  \  \              /   \   \
P3  P5  P8           P3   P5  P8

0045824日 —CORRECT→ 00年5月24日
 /  \  \             /   \   \
P3  P5  P8          P3   P5  P8

DATE IDENTIFYING APPARATUS, DATE IDENTIFYING METHOD, AND COMPUTER-READABLE RECORDING MEDIUM

CROSS-REFERENCE TO RELATED APPLICATION

The present application claims priority to and incorporates by reference the entire contents of Japanese Patent Application No. 2017-025261 filed in Japan on Feb. 14, 2017.

FIELD

The embodiments discussed herein are related to date identifying apparatus, a date identifying method, and a computer-readable recording medium.

BACKGROUND

There exists a photograph on which a taken date of the photograph is printed, and, for example, there exist many photographs that have printed dates thereon among old silver halide photographs having been taken a long time ago.

On the other hand, there recently increases a case where an old silver halide photograph, whose electronic data does not exist, is captured by using a digital camera and the like so as to convert the old silver halide photograph into electronic data.

Examples of related-art are described in Japanese Laid-open Patent Publication No. 2013-084071, in Japanese Laid-open Patent Publication No. 08-221512, and in Japanese Laid-open Patent Publication No. 2000-339472.

Because there exists a case where a date printed on an old silver halide photograph is smudgy, identification accuracy of the date is low in some cases when character recognition such as an Optical Character Recognition (OCR) is performed on the date in a case where the old silver halide photograph is converted into electronic data.

SUMMARY

According to an aspect of an embodiment, a date identifying apparatus includes a segmenting unit that segments date area data, the date area data being data of an area to which a date is estimated to be provided, from image data generated by capturing a medium to which the date is provided, a binarizing unit that executes a binarizing process for binarizing the date area data to generate binarized data, an identification unit that executes an identifying process for executing a recognizing process using deep learning on the binarized data to identify a character string included in the date area data, a correction unit that executes a correcting process according to a kind of a font of the character string on an identified result of the identifying process, and a provision unit that provides, to the image data, date data based on a character string included in the corrected identified result.

The object and advantages of the present disclosure will be realized and attained by means of the elements and combinations particularly pointed out in the claims.

It is to be understood that both the foregoing general description and the following detailed description are exemplary and explanatory and are not restrictive of the present disclosure, as claimed.

BRIEF DESCRIPTION OF DRAWINGS

FIGS. 27 to 32 are diagrams illustrating examples of second correcting processes according to the first embodiment; and FIG. 33 is a diagram illustrating a configuration example of a mobile terminal according to a second embodiment.

DESCRIPTION OF EMBODIMENTS

Preferred embodiments of the present disclosure will be explained with reference to accompanying drawings. In addition, the date identifying apparatus, the date identifying method, and the computer-readable recording medium are not limited to the embodiments described below. In the embodiments, the same reference symbols are provided to configurations having the same functions and to Steps executing the same processes.

[a] First Embodiment

Configuration of Date Identifying Apparatus

Figure 1:
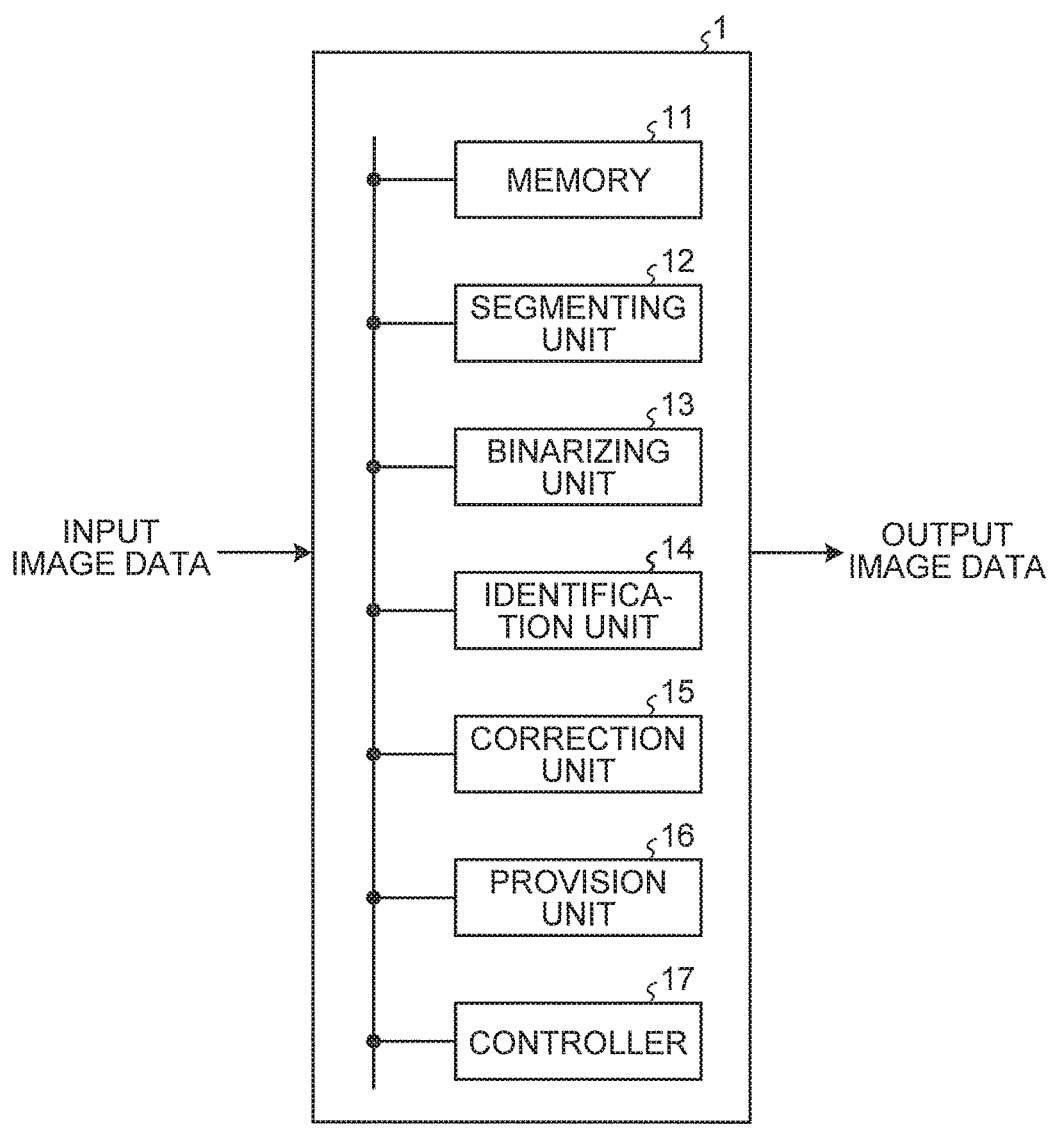
FIG. 1 is a diagram illustrating a configuration example of a date identifying apparatus according to a first embodiment.

FIG. 1 is a diagram illustrating a configuration example of a date identifying apparatus according to a first embodiment. A date identifying apparatus 1 illustrated in FIG. 1 includes a memory 11, a segmenting unit 12, a binarizing unit 13, an identification unit 14, a correction unit 15, a provision unit 16, and a controller 17.

The memory 11 is realized as hardware by, for example, a memory. One example of the memory includes a Random Access Memory (RAM) such as a Synchronous Dynamic Random Access Memory (SDRAM); a Read Only Memory (ROM); a flash memory; etc.

The segmenting unit 12, the binarizing unit 13, the identification unit 14, the correction unit 15, the provision unit 16, and the controller 17 can be realized as hardware by, for example, a processor. One example of the processor includes a Central Processing Unit (CPU), a Digital Signal Processor (DSP), a Field Programmable Gate Array (FPGA), etc. The segmenting unit 12, the binarizing unit 13, the identification unit 14, the correction unit 15, the provision unit 16, and the controller 17 may be realized by a Large Scale Integrated circuit (LSI) that includes a processor and a peripheral circuit. Furthermore, the segmenting unit 12, the binarizing unit 13, the identification unit 14, the correction unit 15, the provision unit 16, and the controller 17 may be realized by using a Graphics Processing Unit (GPU), an Application Specific Integrated Circuit (ASIC), etc.

Image data (hereinafter, may be referred to as "input image data"), which is input to the date identifying apparatus 1, is memorized in the memory 11. Processes to be mentioned later are executed by the segmenting unit 12, the binarizing unit 13, the identification unit 14, the correction unit 15, the provision unit 16, and the controller 17 on the basis of the input image data memorized in the memory 11 so as to generate image data (hereinafter, may be referred to as "output image data") that is output from the date identifying apparatus 1. The controller 17 controls the segmenting unit 12, the binarizing unit 13, the identification unit 14, the correction unit 15, and the provision unit 16.

The input image data is photograph data that is generated by capturing a silver halide photograph as a medium of an image capturing target by, for example, a camera provided in a mobile terminal included in the date identifying apparatus 1. Among silver halide photographs, a silver halide photograph on which a date is printed is a medium of an image capturing target. The medium of the image capturing target is not limited to a silver halide photograph, and may be, for example, a printed photograph, an image printed on a paper, etc. A printed photograph, on which a date is printed, and an image, on which a date is printed, may be media of image capturing targets. In other words, the input image data is image data that is generated by capturing a medium to which a date is provided.

Process of Date Identifying Apparatus

Figure 2:
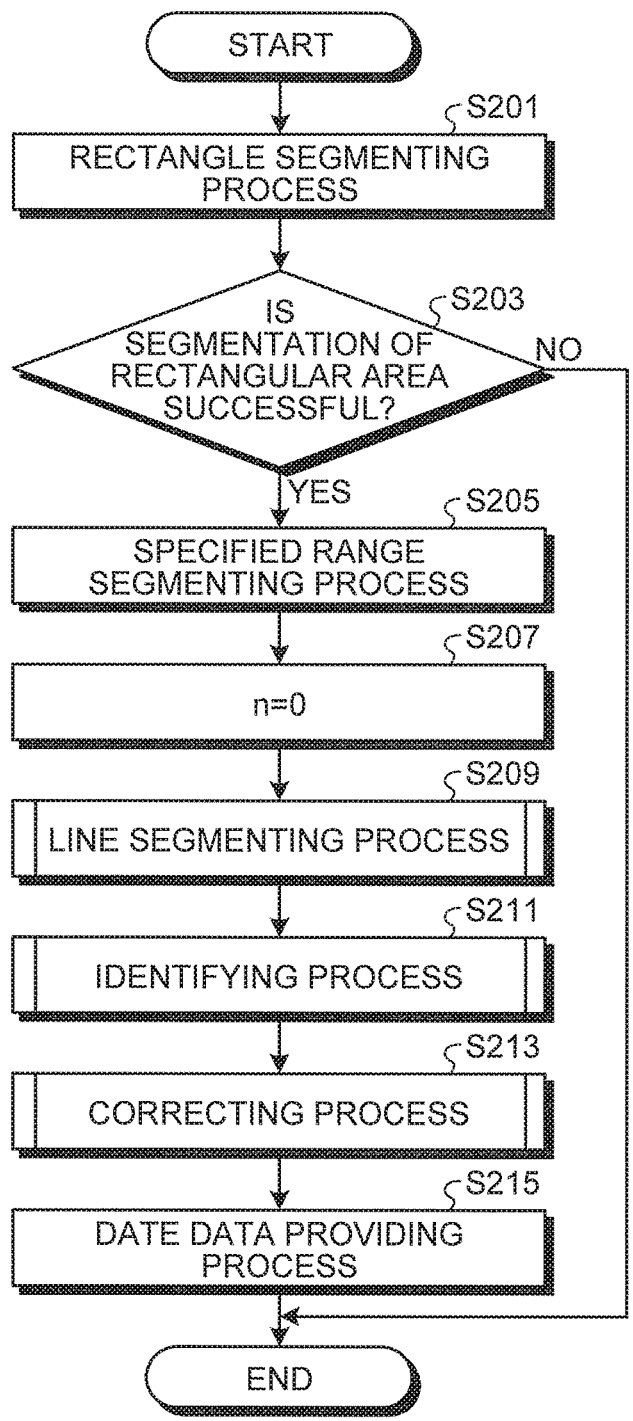
FIG. 2 is a flowchart illustrating a process example of the date identifying apparatus according to the first embodiment.

FIG. 2 is a flowchart illustrating a process example of the date identifying apparatus according to the first embodiment.

In FIG. 2, first, the controller 17 causes the segmenting unit 12 to execute a rectangle segmenting process in Step S201. The segmenting unit 12 segments data (hereinafter, may be referred to as "rectangular area data") on a predetermined rectangular area from input image data. A size of the predetermined rectangular area is defined on the basis of a size of a photograph as a medium of an image capturing target, and the segmenting unit 12 segments the rectangular area data from the input image data along an outline of the photograph.

Next, in Step S203, the segmenting unit 12 determines whether or not segmentation of the rectangular area data is successful. When the segmenting unit 12 succeeds in segmenting the rectangular area data (Step S203: Yes), a process is shifted to Step S205. On the other hand, when the segmenting unit 12 fails in segmenting the rectangular area data (Step S203: No), the process is shifted to "end", the controller 17 forcibly terminates the date identifying process.

In Step S205, the segmenting unit 12 segments a specified range from the rectangular area data that is segmented in Step S201.

Figure 3:
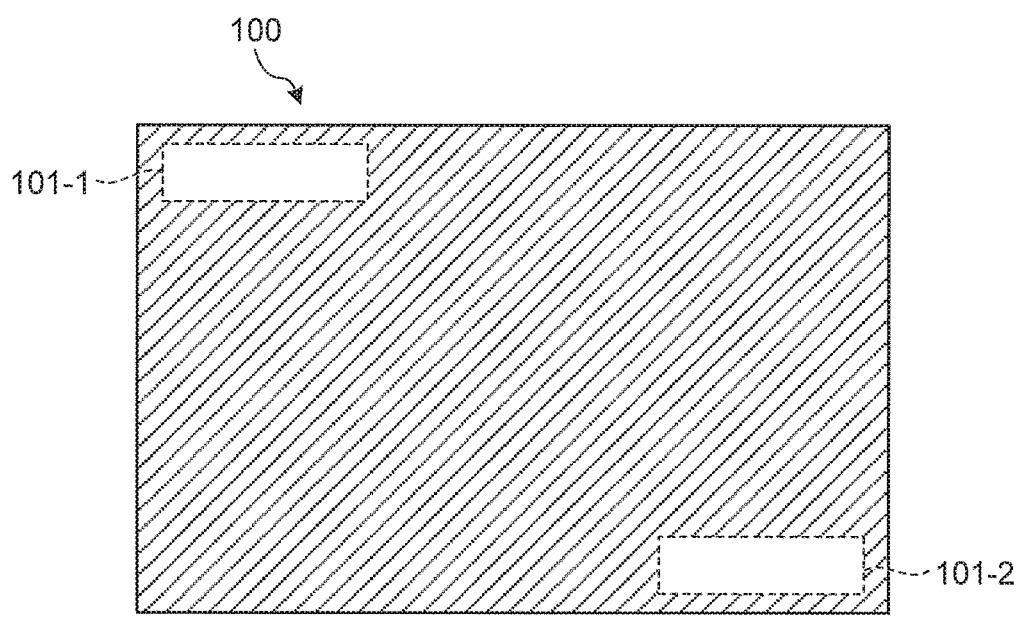
FIG. 3 is a diagram illustrating one example of a specified-range segmenting process according to the first embodiment.

FIG. 3 is a diagram illustrating one example of a specified-range segmenting process according to the first embodiment. When looking at a rectangular-shaped photograph to which a date is provided while arranging the photograph horizontally long, the date is commonly provided to an upper-left or a lower-r part of the photograph in some cases. A date is commonly expressed by a line constituted of numeric characters indicating year, month, and day, which are lining up in a lateral direction, and thus a range indicating the date on the photograph becomes a horizontally-long rectangular range. Therefore, as illustrated in FIG. 3, the segmenting unit 12 segments an upper-left and a lower-right specified ranges of rectangular area data 100 in a horizontally-long rectangular shape from the rectangular area data 100, and thus segments, from the rectangular area data 100, area data 101-1 and 101-2 (hereinafter, may be referred to as "date area data") to which a date is estimated to be provided. Hereinafter, the date area data 101-1 and 101-2 may be correctively referred to as "date area data 101" when they are not distinguished.

Returning to FIG. 2, next, the controller 17 sets kind-of-font counter "n" to be "0" in Step S207.

Next, in Step S209, the controller 17 causes the segmenting unit 12 and the binarizing unit 13 to execute a line segmenting process.

Figure 4:
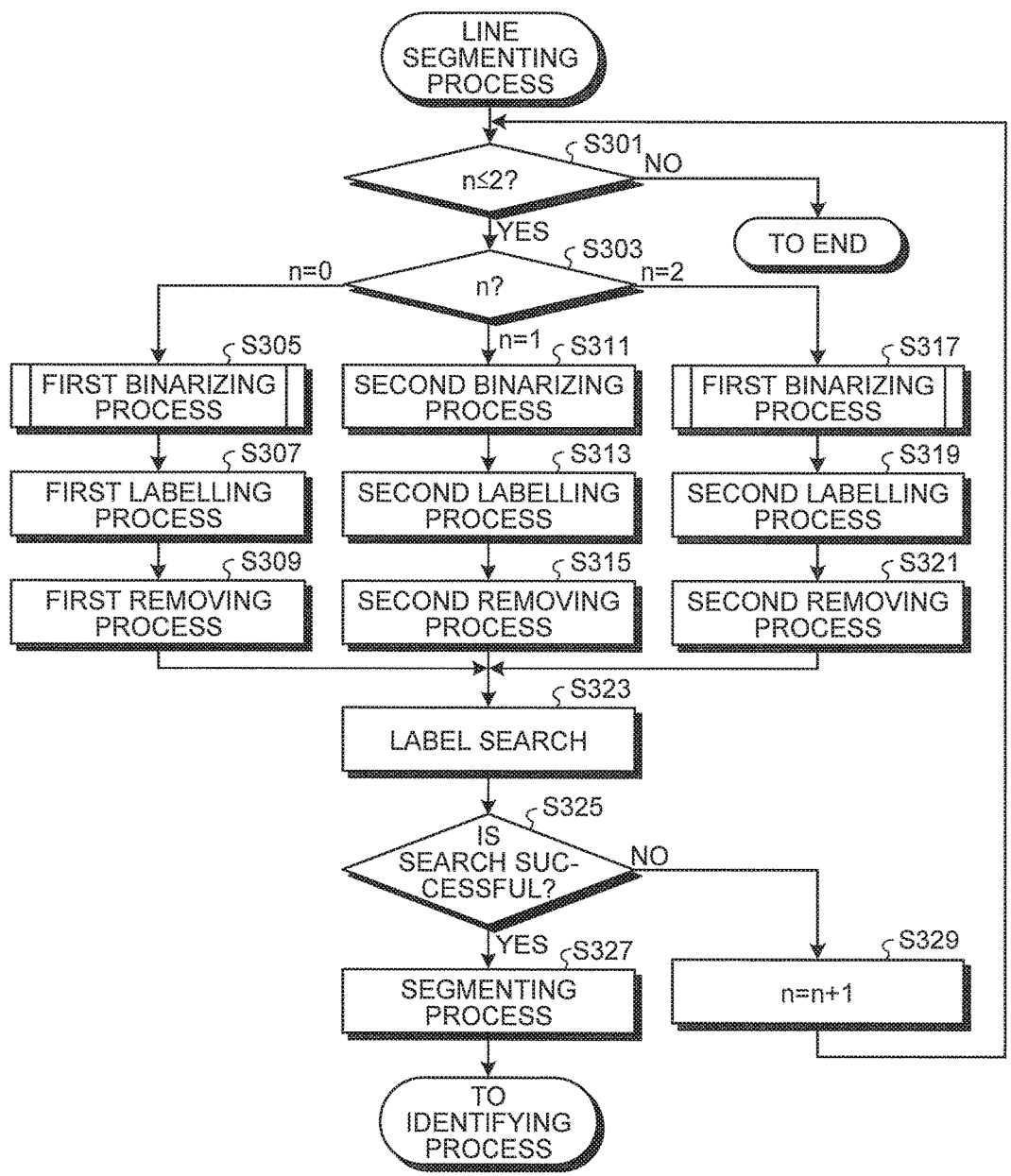
FIG. 4 is a flowchart illustrating one example of a line segmenting process according to the first embodiment.

FIG. 4 is a flowchart illustrating one example the line segmenting process according to the first embodiment. FIGS. 5 to 10 are diagrams illustrating examples of kinds of fonts according to the first embodiment.

Herein, as illustrated in FIGS. 5 to 10, kinds of fonts of dates provided to photographs are broadly divided into three kinds of the first to third kinds.

Figure 5:
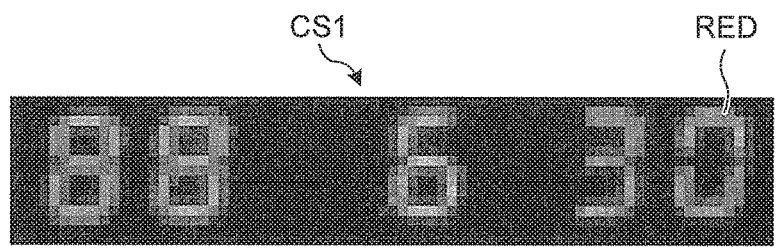
FIGS. 5 to 10 are diagrams illustrating examples of kinds of fonts according to the first embodiment.
Figure 6:
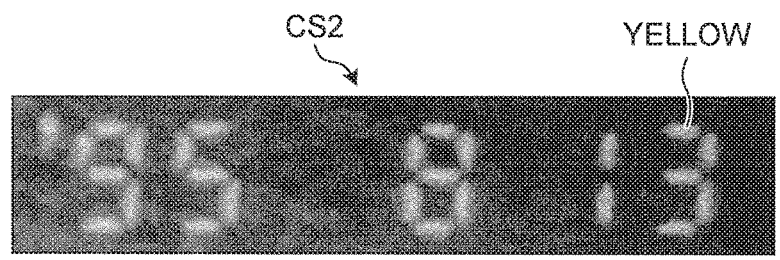

The kinds of fonts include a Data SEGment (DSEG) font as the "first kind" (see FIGS. 5 and 6). A color of a date provided to a photograph by using the DSEG font is commonly the red color as a date CS1 (see FIG. 5), or the yellow color as a date CS2 (see FIG. 6) in many cases. As illustrated in FIGS. 5 and 6, a date expressed by using the DSEG font has characteristics that numeric characters indicating "year", "month", and "day" are commonly separated by using blanks in many cases. Therefore, hereinafter, "kind-of-font counter n=0" corresponds to "colored DSEG font" whose kind of font is the first kind. In FIGS. 5 and 6, a seven segment font is exemplified as one example of the DSEG font. However, the DSEG font applicable to the disclosed technology is not limited to the seven segment font. For example, the disclosed technology may be applicable to a 14 segment font.

Figure 7:
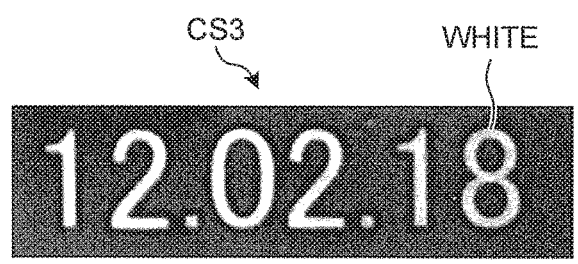
Figure 8:
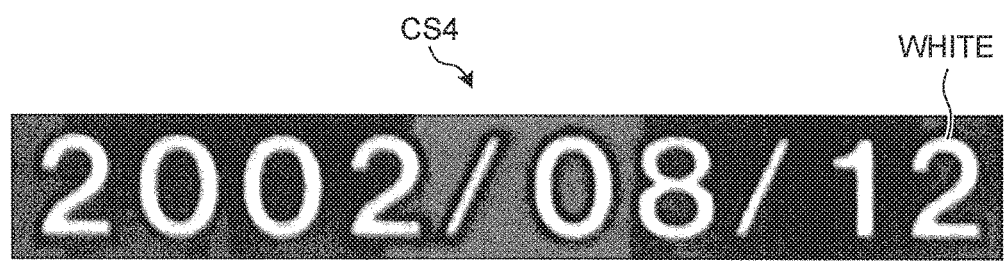

The kinds of fonts include a white color font (hereinafter, may be referred to as "white non-DSEG font") other than the DSEG font as the "second kind" (see FIGS. 7 and 8). As date CS3 (see FIG. 7) and a date CS4 (see FIG. 8), in a date provided to a photograph by using the white non-DSEG font, one character is commonly not divided into segments in contrast to that of the DSEG font. As illustrated in FIGS. 7 and 8, a date expressed by using the white non-DSEG font has characteristics that numeric characters indicating "year", "month", and "day" are commonly separated by using "delimiter characters" such as "." (dot) and "/" (slash) in many cases. Therefore, hereinafter, "kind-of-font counter n=1" corresponds to "white non-DSEG font" whose kind of font is the second kind.

Figure 9:
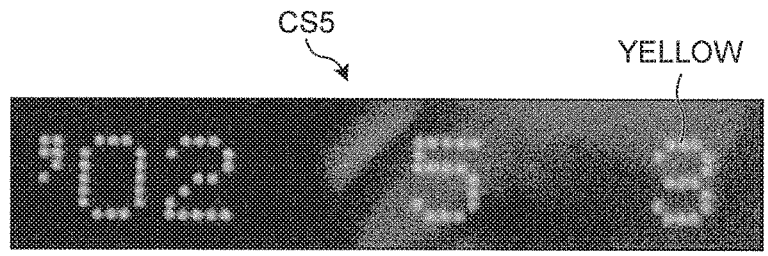

The kinds of fonts include a colored font (hereinafter, may be referred to as "colored non-DSEG font") other than the DSEG font as the "third kind" (see FIGS. 9 and 10). As a date CS5 (FIG. 9) and a date CS6 (FIG. 10), in a date provided to a photograph by using the colored non-DSEG font, one character is commonly not divided into segments in contrast to that of the DSEG font.

Figure 10:
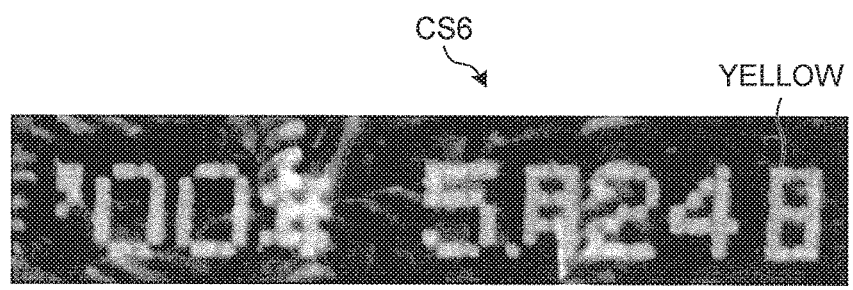

As illustrated in FIG. 10, a date expressed by using the colored non-DSEG font has characteristics that Chinese characters of "年 (year)", "月 (month)", and "日 (day)" are included therein in many cases. Therefore, hereinafter, "kind-of-font: counter n=2" corresponds to "colored non-DSEG font" whose kind of font is the third kind.

Returning to FIG. 4, first, the controller determines whether or not the kind-of-font counter "n" "2" or less in Step S301. When the kind-of-font counter "n" is "3" or more, in other words, when failing in a date identification for all of the kinds of fonts of the first to third kinds (Step S301: No), the process is shifted to "end", and the controller 17 forcibly terminates the date identifying process. On the other hand, when the kind-of-font counter n is "2" or less (Step S301: Yes), the process is shifted to Step S303.

In Step S303, the controller 17 determines a value of the kind-of-font counter "n". When a value of the kind-of-font counter "n" is "0", processes of Steps S305 to S309 are executed, when a value f the kind-of-font counter "n" is "1", processes of Steps S311 to S315 are executed, and when a value of the kind-of-font counter "n" is "2", processes of Steps S317 to S321 are executed. In other words, the processes of Steps S305 to S309 are processes whose identification target is the colored DSEG font, the processes of Steps S311 to S315 are processes whose identification target is the white non-DSEG font, and the processes of Steps S317 to S321 are processes whose identification target is the colored non-DSEG font.

Figure 11:
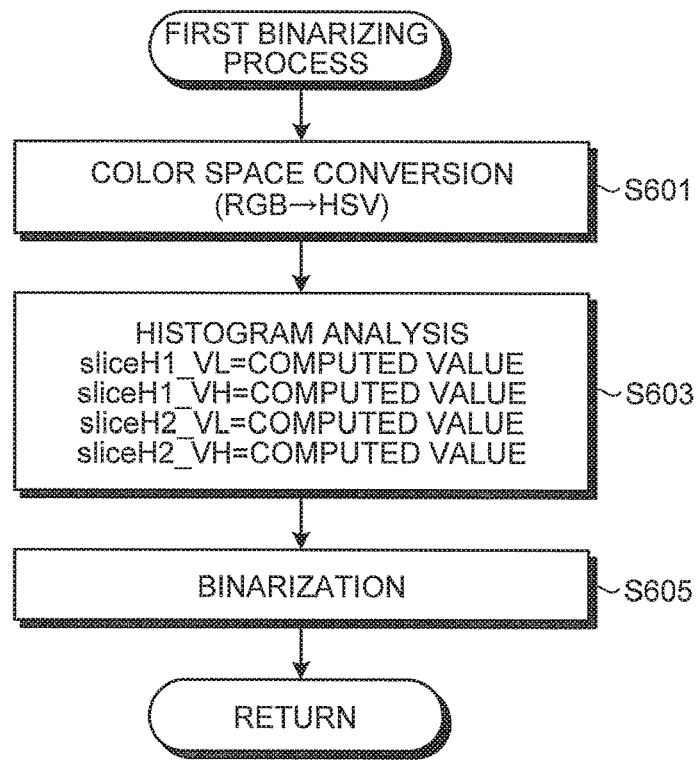
FIG. 11 is a flowchart illustrating one example of a first binarizing process according to the first embodiment.

When determining that a value of the kind-of-font counter "n" is "0" in Step S303, the controller 17 causes the binarizing unit 13 to execute a "first binarizing process" in Step S305. In Step S305, for example, the binarizing unit 13 executes the first binarizing process on date area data 101 by using a histogram analysis, and binarizes the date area data 101 so as to generate binarized data. FIG. 11 is a flowchart illustrating one example of the first binarizing process according to the first embodiment.

First, in the first binarizing process illustrated in FIG. 11, the binarizing unit 13 performs a color space conversion, in Step S601. For example, the binarizing unit 13 converts, into data that is expressed by a HSV color space constituted of three components of a Hue, a Saturation, and a Value, the date area data 101 that is converted into data as an RGB color model expressed by using three primary colors of Red, Green, and Blue.

Next, in Step S603, the binarizing unit 13 performs a histogram analysis on the date area data 101 having been converted into data of a HSV color space. This histogram analysis is performed on the Hue and the Value in the date area data 101 having been converted into data of the HSV color space. When performing the histogram analysis of the Hue, the binarizing unit 13 performs a histogram extraction of the Hue.

Figure 12:
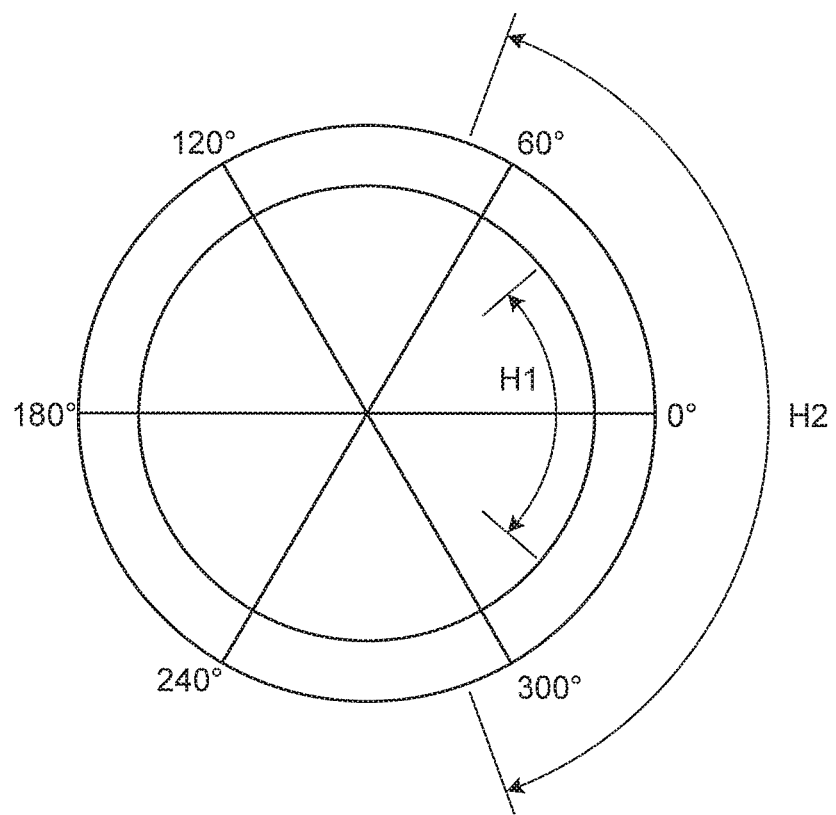
FIG. 12 is a diagram illustrating one example of a histogram extraction of a Hue according to the first embodiment.

FIG. 12 is a diagram illustrating one example of the histogram extraction of the Hue according to the first embodiment. As illustrated in FIG. 12, in the Hue, kinds of colors are expressed by using a range having 0 to 360 degrees, and, when performing a histogram extraction of the Hue, the binarizing unit 13 sets a desired color in the Hue to be 0 degrees so as to extract colors in a desired range whose center is this 0 degrees. For example, when a kind of a font of a date provided to a photograph is the DSEG font, a color of the e is commonly an orange color such as a red color and a yellow color. Thus, the binarizing unit 13 sets a part of an orange color, which is estimated to be the most frequent as a date color, to be 0 degrees within colors expressed in 0 to 360 degrees, and extracts colors in a predetermined range whose center is this 0 degrees. For example, when conditions H1 and H2 are set as conditions of the Hue and the condition. H1 is ±40 degrees and the condition H2 is ±80 degrees, the binarizing unit 13 extracts pixels of colors included in the condition H1 and pixels of colors included in the condition H2 among from pixels that constitute the date area data 101. Thus, the binarizing unit 13 performs the histogram extraction of the Hue. The binarizing unit 13 logarithmically converts a histogram of the extracted Hue to facilitate handling of the data.

Returning to FIG. 11, next, the binarizing unit 13 computes binarizing slices from a histogram of the Value, in Step S603. In other words, the binarizing unit 13 computes, from the histogram of the Value, a threshold that is used when determining each pixel is "1" or "0" in performing the binarization. For example, the binarizing unit 13 sets conditions V1 and V2 as conditions of the Value, computes, as the condition V1, a first threshold that is an 80% value in a histogram of the Value of whole of the date area data 101, and computes, as the condition V2, a second threshold that is 40% value in the histogram of the Value of whole of the date area data 101. The binarizing unit 13 performs, by using the conditions of the Value and the Hue that are set in this way, the histogram analysis that determines whether or not each of the pixels that constitute the date area data 101 is applied to both the conditions.

In other words, when performing a histogram analysis that determines whether or not the Hue and the Value are applied to both the conditions of the Hue and the Value, the binarizing unit 13 first computes a slice H1_VL that is a threshold using the condition H1 of the Hue and the condition V1 of the Value, a slice H1_VH that is a threshold using the condition H1 of the Hue and the condition V2 of the Value, a slice H2_VL that is a threshold using the condition H2 of the Hue and the condition V1 of the Value, and a slice H2_VH that is a threshold using the condition H2 of the Hue and the condition V2 of the Value. The binarizing unit 13 determines whether or not the Hue and the Value of each of the pixels that constitute the date area data 101 satisfies each computed threshold so as to perform a histogram analysis of the date area data 101.

Next, the binarizing unit 13 binarizes the date area data 101 to generate binarized data in Step S605. For example, when each of the pixels that constitutes the date area data 101 satisfies the computed threshold, the binarizing unit 13 sets "1" for the corresponding pixel, and when does not satisfy the computed threshold, the binarizing unit 13 sets "0" for the corresponding pixel so as to binarize the date area data 101, and thus generates the binarized data. In the date area data 101 to be binarized, for example, the binarizing unit 13 converts a pixel of "1" into black, and converts a pixel of "0" into white, so as to convert into data constituted of black and white. Thus, in Step S305 illustrated in FIG. 4, the binarizing unit 13 sets the colored DSEG font to be an identification target, and executes the first binarizing process for binarizing the date area data 101 by using thresholds based on the Hue and the Value Returning to FIG. 4, next, the controller 17 causes the segmenting unit 12 to execute a "first labelling process" in Step S307. FIGS. 13 to 19 are diagrams illustrating examples of the first labelling processes according to the first embodiment.

Figure 13:
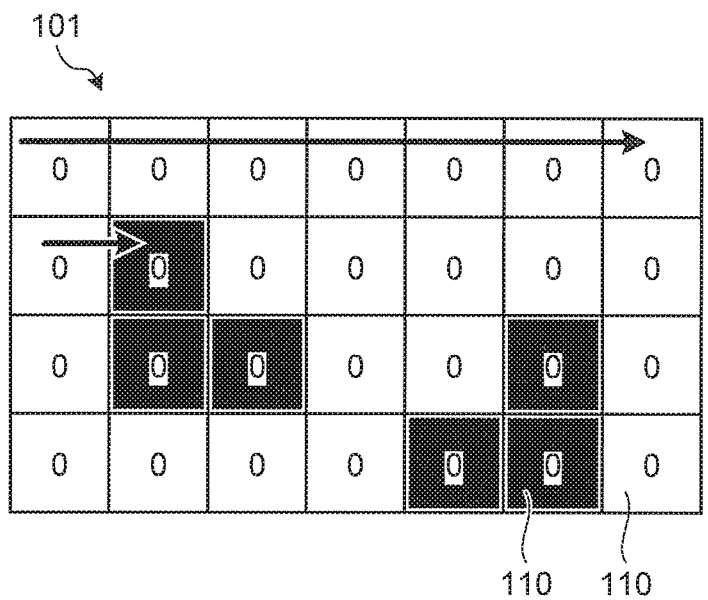
FIGS. 13 to 19 are diagrams illustrating examples of first labelling processes according to the first embodiment.

In the first labelling process, as illustrated in FIG. 13, the segmenting unit 12 first performs raster scanning on a plurality of pixels 110 that are lined up in a vertical direction and a lateral direction so as to constitute the date area data 101. For example, the segmenting unit 12 performs scanning in a right direction from the pixel 110 positioning at the most upper-left position in the date area data 101 that is constituted of the black and white pixels 110 caused by the binarization, and, when reaches the rightmost pixel 110, shifts a scanning target to the leftmost pixel 110 in the one lower row, and performs scanning again in the right direction from this pixel 110. The segmenting unit 12 repeatedly performs these scans on all of the pixels 110 that constitute the date area data 101.

Figure 14:
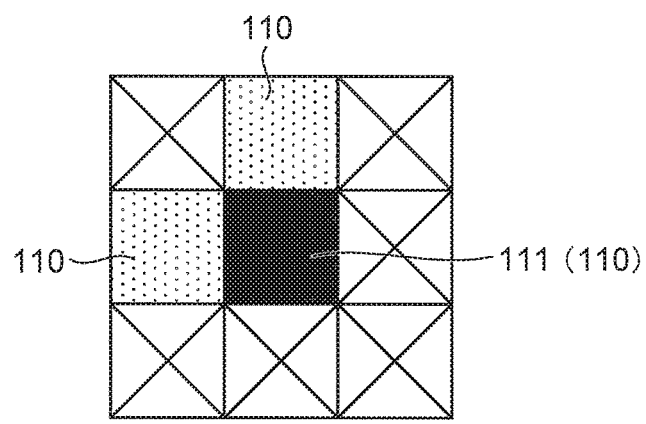
Figure 15:
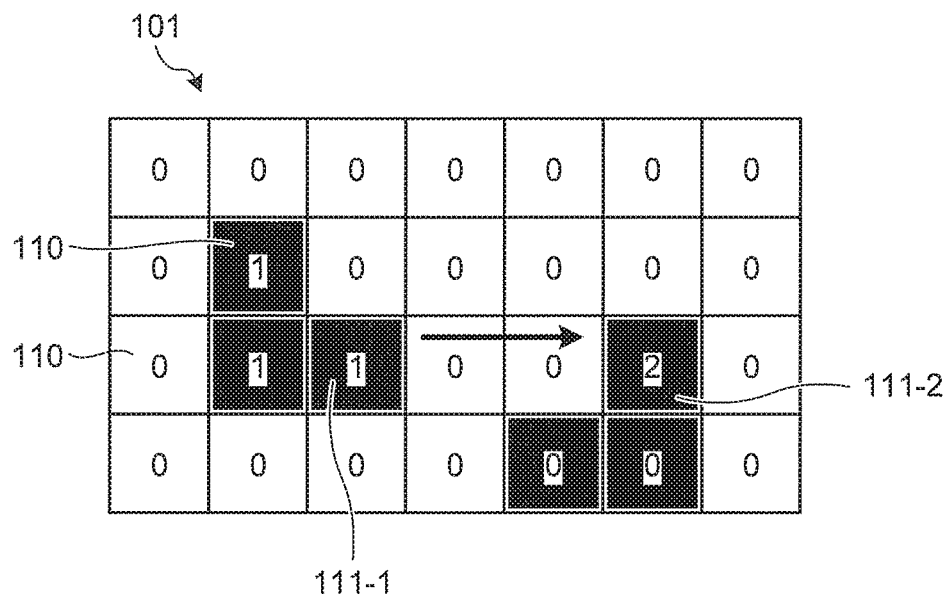

As illustrated in FIG. 14, in a case where the segmenting unit 12 performs raster scanning on the date area data 101, when detecting the black pixel 110, the segmenting unit 12 sets the detected black pixel 110 to be a target pixel 111, and checks whether or not there exists a label number at the pixel 110 left of the target pixel 111 and at the pixel 110 up of the target pixel 111. In FIGS. 13 and 15 to 19, the pixels 110 to which "0" is provided are pixels not having label numbers, and the pixels 110 to which numeric characters other than "0" are provided are pixels having the label numbers. When there exists a label number at the pixel 110 left of the target pixel 111 or the pixel 110 up of the target pixel 111, the segmenting unit 12 provides, to the target pixel 111, the minimum label number of the label numbers of the left pixel 110 and the upper pixel 110. In other words, when the label numbers differ from each other between the pixel 110 left of the target pixel 111 and that up of the target pixel 111, the segmenting unit 12 provides a smaller label number thereof to the target pixel 111. Therefore, for example, "1" is provided to a target pixel 111-1 illustrated in FIG. 15 as a label number. On the other hand, when there exists no label number at the pixel 110 left of the target pixel 111 and that up of the target pixel 111, the segmenting unit 12 provides a new label number to the target pixel 111. In other words, when there exists no label number at the pixel 110 left of the target pixel 111 and that up of the target pixel 111, the segmenting unit 12 provides, to the target pixel 111, a label number of "value of last provided label number+1". Therefore, for example, "2" is provided to the target pixel 111-2 illustrated in FIG. 15 as a label number.

Figure 16:
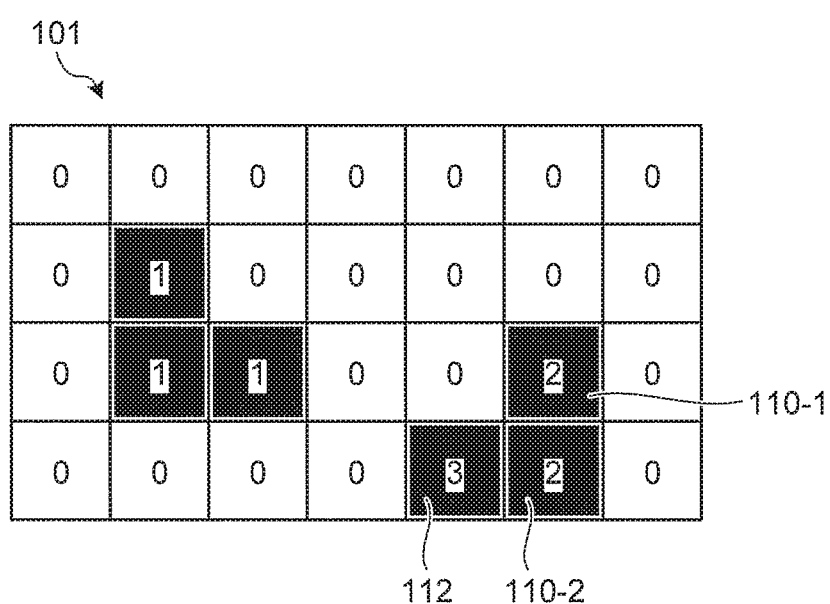
Figure 17:
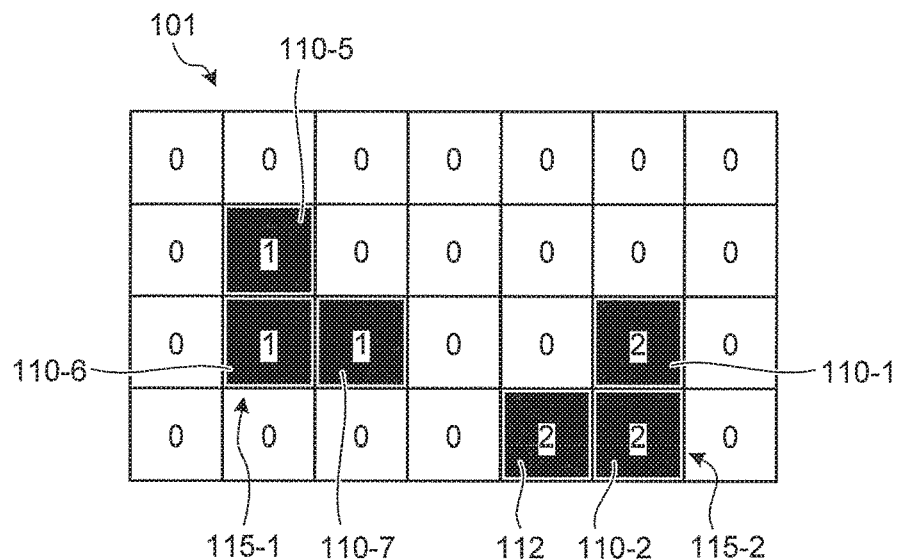

As illustrated in FIG. 16, when there exists the plurality of pixels 110 having label numbers existing adjacently to each other, the segmenting unit 12 unifies, into the same value, all of the label numbers a series of the plurality of pixels 110 having label numbers. For example, as illustrated in FIG. 16, when there exist a series of the pixels 110-1, 110-2, and 112 having label numbers existing adjacently to each other, the segmenting unit 12 unifies the label numbers of this series of the pixels 110-1, 110-2, and 112 into the minimum label number within the label numbers provided to the series of the pixels 110-1, 110-2, and 112. Therefore, for example, a label number "3" of the pixel 112 illustrated in FIG. 16 is changed into "2" by the segmenting unit 12 as illustrated in FIG. 17. Thus, the label numbers of the series of the pixels 110-1, 110-2, and 112, having the label numbers, existing adjacently to each other are unified into "2".

The segmenting unit 12 handles a series of the plurality of pixels 110 whose provided label numbers are the same as one label 115. As illustrated in FIG. 17, for example, a series of the pixels 110-5, 110-6, and 110-7, whose label numbers are the same as "1", are handled as one label 115-1, and the series of the pixels 110-1, 110-2, and 112, whose label numbers are the same as "2", are handled as another one label 115-2. Hereinafter, when the labels 115-1 and 115-2 are not distinguished, they may be correctively referred to as the labels 115.

Figure 18:
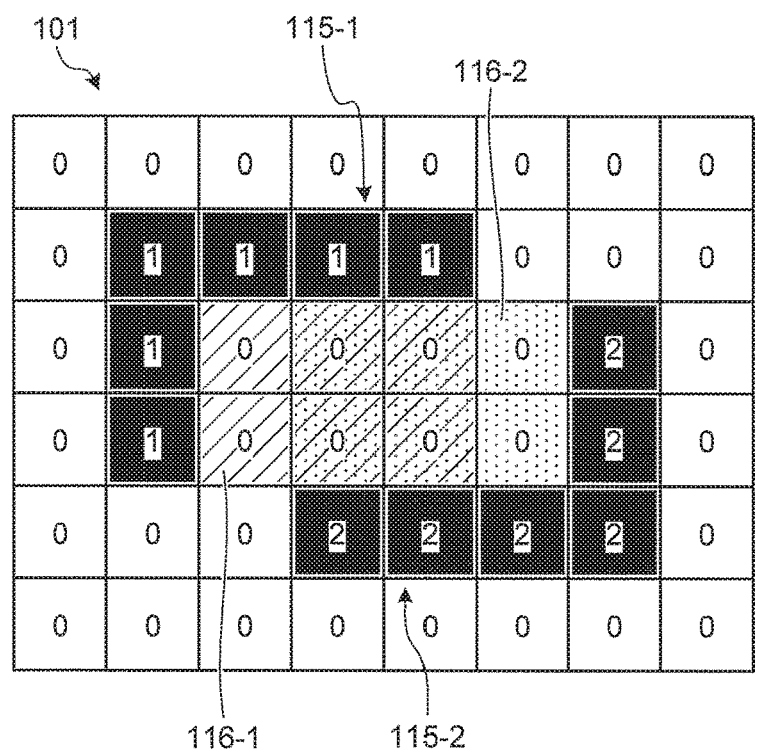
Figure 19:
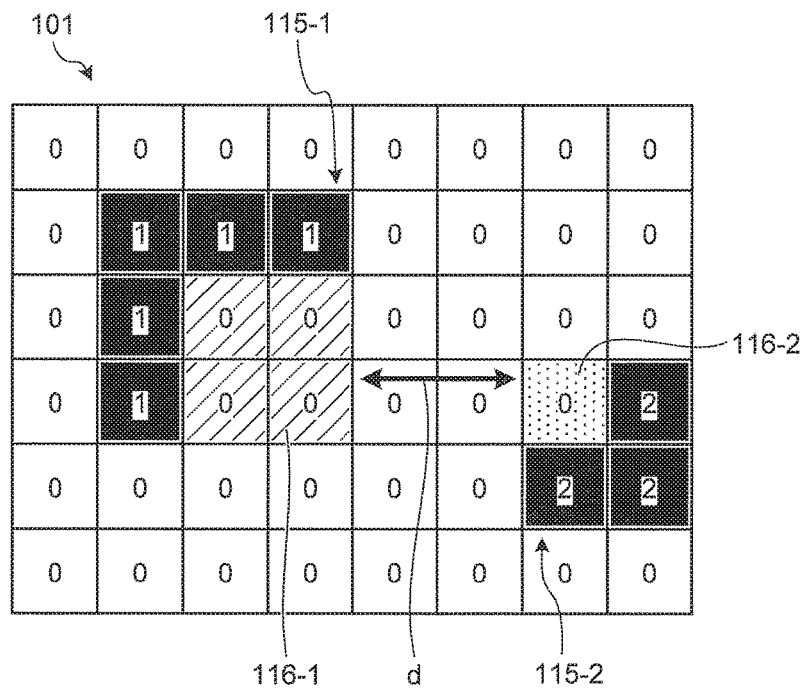

In the first labelling process (Step S307), "adjacency integration" is next, performed, which is process of the segmenting unit 12 for integrating the plurality of labels 115, which are separated from each other in a comparatively small distance, into the one label 115. The adjacency integration is broadly divided into two kinds of "first adjacency integration" and "second adjacency integration". FIG. 18 is a diagram illustrating one example of the first adjacency integration according to the first embodiment. FIG. 19 is a diagram illustrating one example of the second adjacency integration according to the first embodiment.

In FIG. 10, the label 115-1 whose provided label number is "1" and the label 115-2 whose provided label number is "2" are separated from each other. In the first adjacency integration, when a label area 116-1, which is a rectangular area constituted of the label 115-1, and a label area 116-2, which is a rectangular area constituted of the label 115-2, are overlapped with each other, the segmenting unit 12 integrates the labels 115-1 and 115-2 so as to handle the labels 115-1 and 115-2 as the one label 115. Herein, as illustrated in FIG. with respect to the label 115-1, in the one label 115-1 that extends in a vertical and a lateral directions, a rectangular area to the pixel 110 positioning at an end part in the lateral direction and positioning at a position of the same height as that of the pixel 110 at an end part in the vertical direction is set as the label area 116-1 of the label 115-1. Similarly, as illustrated in FIG. 18, with respect to the label 115-2, in the one label 115-2 that extends in the vertical and the lateral directions, a rectangular area to the pixel 110 positioning at an end part in the lateral direction and positioning at a position of the same height as that of the pixel 110 at an end part in the vertical direction s set as the label area 116-2 of the label 115-2. Therefore, in FIG. 18, a part of the label area 116-1 and a part of the label area 116-2 overlap with each other. Therefore, the segmenting unit 12 performs the adjacency integration on the labels 115-1 and 115-2 so as to handle the labels 115-1 and 115-2 as the same one label 115. Thus, the first adjacency integration is an adjacency integration that is performed in a case where parts of a plurality of label areas overlap with each other.

On the other hand, in FIG. 19 similarly to the case illustrated in FIG. 18, the label 115-1 to which a label number "1" is the label 115-2 to which a label number "2" is provided are separated from each other. In the case illustrated in FIG. 19, the label area 116-1 constituted of the label 115-1 and the label area 116-2 constituted of the label 115-2 are not overlapped with each other, and the label area 116-2 exists in a position separated from the label area 116-1 by a distance "d". Therefore, in the second adjacency integration, when the distance "d" between the label areas 116-1 and 116-2 is less than a threshold THD, the segmenting unit 12 integrates the labels 115-1 and 115-2 so as to handle the labels 115-1 and 115-2 as the one label 115. Because the distance "d" between the label areas 116-1 and 116-2 is two pixels in FIG. 19, for example, when the threshold THD is set to be five pixels, the segmenting unit 12 integrates the labels 115-1 and 115-2 so as to handle the labels 115-1 and 115-2 as the one label 115. Thus, the second adjacency integration is an adjacency integration that is performed in a case where a plurality of label areas exists within a distance less than the threshold THD.

As described above, in the first labelling process (Step S307), both of the first and the second adjacency integrations are performed. Hereinafter, when the label areas 116-1 and 116-2 are not distinguished, they may be correctively referred to as a label area 116.

Returning to FIG. 4, next, the segmenting unit 12 performs "first removing process" in Step S309. In Step S309, the segmenting unit 12 performs the first removing process on binarized data on which the first labelling process (Step S307) is executed, and removes a noise from the binarized data so as to extract a label (hereinafter, may be referred to as "identification probability label") having an identification probability as a character among from the plurality of labels 115. In other words, the identification probability label is a label that is constituted of remaining binarized data after removing binarized data constituting the label 115 being a noise from the binarized data on which the first labelling process is executed. The removal of the noise in the first removing process is performed on the basis of a size of the label area 116. The segmenting unit 12 determines, on the basis of a size of the label area 116, the label 115 having a probability of expressing a numeric character "1", the label 115 having a probability of expressing a character other than the numeric character "1", or the label 115 having no probability of expressing a character (in other words, noise), and removes the label 115 having determined to be the noise from the binarized data. The label 115 having a probability of expressing a numeric character "1" and that having a probability of expressing a character other than the numeric character "1" are extracted as an identification probability label.

When determining whether or not the label 115 is a noise, "reference size" of the label area 116 is set, the label 115 including the label area 116 whose size is not applicable to this reference size and further whose aspect ratio between a lateral and a vertical lengths is less than 1:3 is removed as a noise. For example, when looking at a rectangular-shaped photograph while arranging the photograph horizontally in the first removing process, a length of 0.3% or more and less than 2.2% lateral length of the photograph is set as a lateral length of a reference size, and a length of 2.0% or more and less than 4.0% of a vertical length the photograph is set as a vertical length of the reference size.

So far, processes of Steps S305 to S309 whose identification targets are the colored DSEG font have been explained.

On the other hand, when determining that the kind-of-font counter "n" is "1" in Step S303, the controller 17 causes the binarizing unit 13 to execute a "second binarizing process" in Step S311. For example, the binarizing unit 13 executes the second binarizing process on the date area data 101 by using "Binarization of Otsu" so as to binarize the date area data 101, and generates binarized data.

Next, the controller 17 causes the segmenting unit 12 to execute a "second labelling process" in Step S313. The second labelling process is a process obtained by excluding only the second adjacency integration from the processes included in the aforementioned first labelling process (Step S307). In other words, in the second labelling process, the aforementioned processes illustrated in FIGS. 13 to 18 as an example are executed, however, the aforementioned process illustrated in FIG. 19 as an example are not executed.

Next, the segmenting unit 12 executes a "second removing process" in Step S315. In Step S315, the segmenting unit 12 executes the second removing process on binarized data on which the second labelling process (Step S313) is executed, and removes a noise from the binarized data so as to extract an identification probability label among from the plurality of labels 115. The removal of the noise in the second removing process is performed, similarly to the first removing process, on the basis of a size of the label area 116. For example, when looking at a rectangular-shaped photograph while arranging the photograph horizontally long, in the second removing process, a length of 0.4% or more and less than 4.0% of a lateral length of the photograph is set as a lateral length of a reference size, and a length of 2.0% or more and less than 5.0% of a vertical length the photograph is set as vertical length of the reference size.

So far, processes of Steps S311 to S315 whose identification targets are the white non-DSEG font have been explained.

When determining that the kind-of-font counter "n" is "2" in Step S303, the controller 17 causes, similarly to Step S305, the binarizing unit 13 to execute the first binarizing process in Step S317.

Next, the controller 17 causes, similarly to Step S313, the segmenting unit 12 to execute the second labelling process in Step S319.

Next, the segmenting unit 12 executes, similarly to Step S315, the second removing process in Step S321.

So far, processes of Steps S317 to S321 whose identification targets are the colored non-DSEG font have been explained.

After the process of Step S309, S315, or S321, the process is shifted to Step S323.

Figure 20:
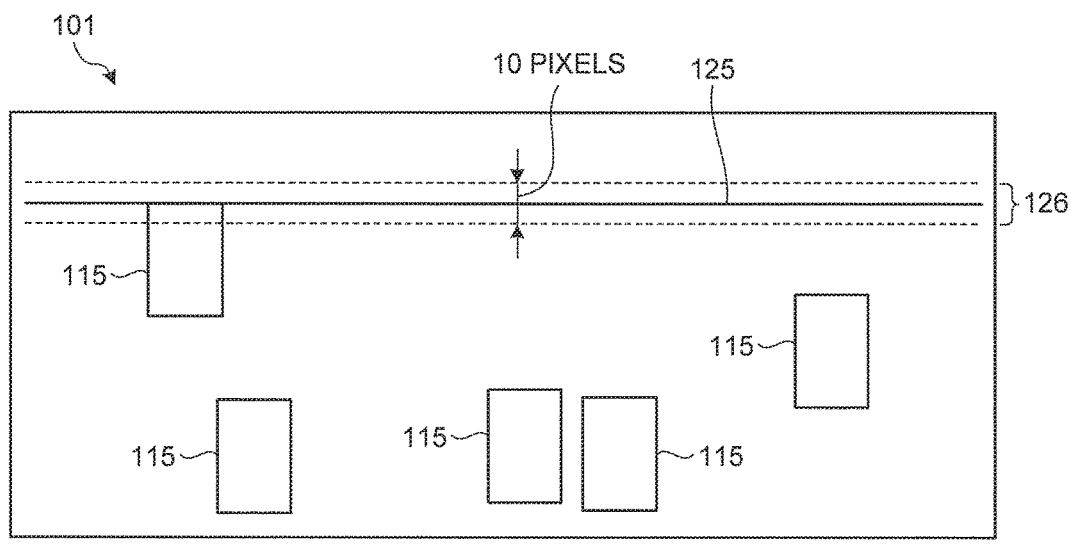
FIG. 20 is a diagram illustrating one example of a label search according to the first embodiment.

In Step S323, the segmenting unit 12 performs a label search. FIG. 20 is a diagram illustrating one example of a label search according to the first embodiment. All of the labels 115 illustrated in FIG. 20 are identification probability labels.

In FIG. 20, the segmenting unit 12 sets, as a reference, the identification probability label 115 positioning at an uppermost position of the plurality of identification probability labels 115 in the date area data 101, and further sets a detection line 125 that extends in the lateral direction from an upper end position of this label 115 positioning at the uppermost position. Hereinafter, the label 115 that becomes a reference in setting the detection line 125 may be referred to as a "reference label".

Next, the segmenting unit 12 sets, as a search range 126, a predetermined range vertically extended from the set detection line 125. For example, the segmenting unit 12 sets, as the search range 126, a range of upper five pixels and lower five pixels from the detection line 125, in other words, a range extending in the lateral direction with a width of vertically extending ten pixels.

Next, the segmenting unit 12 performs a label search that searches another identification probability label 115 in which the search range 126 and a part of the label area 116 overlap with each other among from the other identification probability labels 115 other than the reference label 115.

When two or more of the other identification probability labels 115 in which the search range 126 and a part of the label area 116 overlap with each other are detected, the segmenting unit 12 sets, as an "upper end line", a line extending in the lateral direction from an upper end position of the identification probability label 115 positioning at a uppermost position, and further sets, as a "lower end line", a line extending in the lateral direction from a lower end position of the identification probability label 115 positioning at a lowermost position, among the reference label 115 and the plurality of other detected identification probability labels 115.

On the other hand, when two or more of the other identification probability labels 115 in which the search range 126 and a part of the label area 116 overlap with each other are not detected, the segmenting unit 12 sets the new detection line 125 and the new search range 126 by using, as a new reference label, the identification probability label 115 positioning the next lower side of a reference label obtained by a present search among from the plurality of identification probability labels 115 in the date area data 101. The segmenting unit 12 performs a label search similar to the aforementioned on the basis of the new search range 126 so as to try setting an upper end line and a lower end line.

The segmenting unit 12 repeats the aforementioned label search until the identification probability label 115, among the plurality of identification probability labels 115 in the date area data 101, positioning at a lowermost position becomes a reference label so as to try setting an upper end line and a lower end line.

Returning to FIG. 4, in Step S325, the controller 17 next determines whether or not the label search of Step S323 is successful. When the segmenting unit 12 succeeds in setting both the upper end line and the lower end line in the label search of Step S323, the controller 17 determines that the label search is successful. When the label search is successful (Step S325: Yes), the process is shifted to Step S327. On the other hand, when the segmenting unit 12 does not succeed in setting the upper end line or the lower end line in the label search of Step S323, the controller 17 determines that the label search is failed. When the label search is failed (Step S325: No), the process is shifted to Step S329.

Herein, for example, when a date is included in a lower-right specified range and is not included in an upper-left specified range in the rectangular area data 100 illustrated in FIG. 3, a label search performed on the date area data 101-2 is to be successful, whereas a label search performed on the date area data 101-1 is to be failed.

In Step S329, the controller 17 increments the kind-of-font counter "n". After the process of Step S329, the process returns to Step S301.

On the other hand, in Step S327, the segmenting unit 12 executes a segmenting process. In Step S327, the segmenting unit 12 segments, on the basis of an upper end line and a lower end line set in Step S323, data (hereinafter, may be referred to as "target area data") existing in an area between the upper end line and the lower end line from the date area data 101.

After the process of Step S327, the process is shifted to Step S211 illustrated in FIG. 2.

Figure 21:
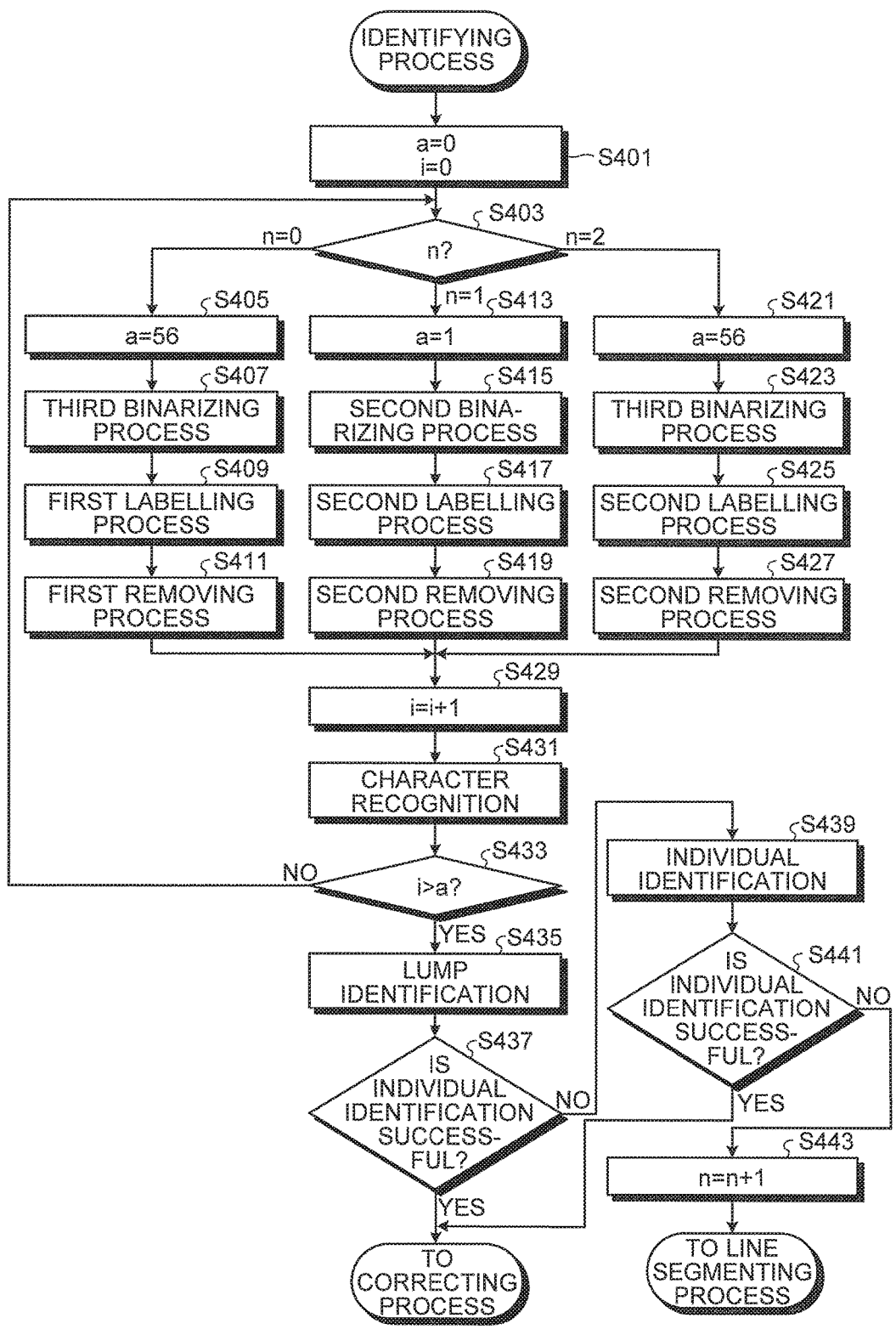
FIG. 21 is a diagram illustrating one example of an identifying process according to the first embodiment.

Returning to FIG. 2, in Step S211, the controller 17 causes the identification unit 14 to execute an identifying process. FIG. 21 is a diagram illustrating one example of the identifying process according to the first embodiment.

As illustrated in FIG. 21, in Step S401, the controller 17 first sets a specified process count "a" and a number-of-processes counter "i" into "0".

Next, in Step S403, the controller 17 determines a value of the kind-of-font counter "n". When the kind-of-font counter "n" is "0", processes of Steps S405 to S411 are executed, when the kind-of-font counter "n" is "1", processes of Steps S413 to S419 are executed, and when the kind-of-font counter "n" is "2", processes of Steps S421 to S427 are executed. In other words, the processes of Steps S405 to S411 are processes whose identification targets are the colored DSEG font, processes of Steps S413 to S419 are processes whose identification targets are the white non-DSEG font, and the processes of Steps S421 to S427 are processes whose identification targets are the colored non-DSEG font.

When determining that the kind-of-font counter "n" is "0" in Step S403, the controller 17 sets the specified process count "a" to be "56" in Step S405. When the specified process count "a" is set to be "56" in Step S405, processes of Step S407 to S411, and S431 are repeated for 56 times by using 56 binarizing slices in a range of gradation values 26 to 246 at intervals of a gradation value "4". In other words, the binarizing slice is set to be "26" and the processes of Step S407 to S411, and S431 are executed in the first process, the binarizing slice is set to be "30" and the processes of Step S407 to S411, and S431 are executed in the second process, and the binarizing slice is set to be "34" and the processes of Step S407 to S411, and S431 are executed in the third process. Thereafter, similarly to the aforementioned, 56 binarizing slices are set in a range of gradation values 26 to 246 while increasing the binarizing slice by "4" up to "246", and the processes of Step S407 to S411, and S431 are repeatedly executed by using each binarizing slice.

In Step S407, the controller 17 causes the binarizing unit 13 to execute a "third binarizing process". In the third binarizing process, when the number-of-processes counter "i" is "0", the binarizing unit 13 sets a binarizing slice be "26" and binarizes an R component and an R-G component of target area data so as to generate binarized data. Therefore, at each time the one third binarizing process is executed, two binarized data of binarized data of the R component and binarized data of the R-G component are generated. In the third binarizing process, when the number-of-processes counter "i" is "1", the binarizing unit 13 sets a binarizing slice to be "30" and binarizes an R component and an R-G component of target area data to generate binarized data, and, when the number-of-processes counter "i" is "2", the binarizing unit 13 sets a binarizing slice to be "34" and binarizes the R component and the R-G component of the target area data to generate binarized data. Therefore, when the process of Step S407 is repeated for 56 times in accordance with the increment of the number-of-processes counter "i" in Step S429, 56 binarized data of the R component and 56 binarized data of the R-G component are generated.

Next, in Step S409, the controller 17 causes the segmenting unit 12 to execute the first labelling process. In Step S409, the segmenting unit 12 executes the first labelling process on binarized data generated by the third binarizing process.

Next, in Step S411, the segmenting unit 12 executes the first removing process. In Step S411, the segmenting unit 12 executes the first removing process on binarized data on which the first labelling process (Step S409) is executed.

So far, processes of Steps S405 to S411 whose identification targets are the colored DSEG font have been explained.

On the other hand, when determining that the kind-of-font counter "n" is "1" in Step S403, the controller 17 sets the specified process count "a" to be "1" in Step S413. When the specified process count "a" is set to be "1" in Step S413, processes of Steps S413 to S419 are executed only once.

Next, in Step S415, the controller 17 causes the binarizing unit 13 to execute the second binarizing process.

Next, in Step S417, the controller 17 causes the segmenting unit 12 to execute the second labelling process.

Next, in Step S419, the segmenting unit 12 executes the second removing process.

So far, processes of Steps S413 to S419 whose identification targets are the white non-DSEG font have been explained.

When determining that the kind-of-font counter "n" is "2" in Step S403, the controller 17 sets, similarly to Step S405, the specified process count "a" to be "56" in Step S421.

Next, in Step S423, the controller 17 causes the binarizing unit 13 to execute the third binarizing process, similarly to Step S407.

Next, in Step S425, the controller 17 causes the segmenting unit 12 to execute the second labelling process, similarly to Step S417.

Next, in Step S427, the segmenting unit 12 executes the second removing process, similarly to Step S419.

So far, processes of Steps S421 to S427 whose identification targets are colored non-DSEG font have been explained.

Herein, in Step S411, the first removing process is executed on binarized data on which the first labelling process (Step S409) has been executed so as to remove a noise from the binarized data, and thus a label (hereinafter, may be referred to as "identification target label") that is an identification target as a character is extracted among from the plurality of labels 115. In Steps S419 and S427, the second removing process is executed on the binarized data on which the second labelling process (Steps S417 and S425) has been executed so as to remove a noise from the binarized data, and thus an identification target label is extracted among from the plurality of labels 115.

After the process of Step S411, S419, and S427, the process is shifted to Step S429.

In Step S429, the controller 17 increments the number-of-processes counter "i".

Next, in Step S431, the controller 17 causes the identification unit 14 to perform character recognition on the identification target label. The identification unit 14 performs the character recognition on the identification target label by using, for example, a Convolutional Neural Network (CNN) that is a kind of the Deep Learning. Hereinafter, kinds of characters, which are able to be recognized by the identification unit 14 by using the CNN, are total 14 kinds of, for example, numeric characters of "0" to "9", and "/", "年", "月", and "日" that are used as delimiter characters of a date. In other words, the date area data 101 includes a date as a character string constituted by using any of these characters of the 14 kinds.

Herein, because an expressive a model is commonly improved by using various learning data in the CNN, an accuracy of the character recognition can be improved. On the other hand, because layers of the CNN become deeper as the expressive ability of the model is higher, a computation amount needed for the character recognition becomes larger. In other words, in the CNN, the computation amount needed for the character recognition becomes larger as an amount of learning data becomes larger. Therefore, in the present embodiment, confusing data in character recognition is excluded from learning data so as to generate a model whose layers are shallow, and the identification unit 14 performs character recognition on an identification target label by using the CNN to which the model having the shallow layers is applied.

Figure 22:
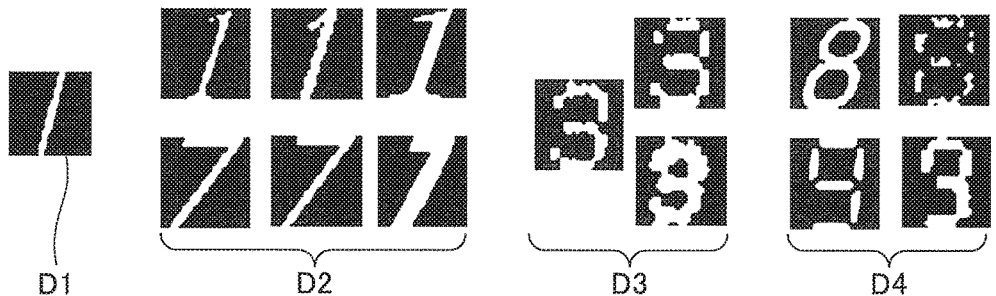
FIG. 22 is a diagram illustrating one example of confusing data according to the first embodiment.

FIG. 22 is a diagram illustrating one example of the confusing data according to the first embodiment. In FIG. 22, for example, data D1 is confusing in that the data D1 indicates "/" or "1" (numeric character). For example, each data in a data group D2 is confusing in that the corresponding data indicates "1" (numeric character) or "7" (numeric character). For example, each data in a data group D3 is confusing in that the corresponding data indicates "3" (numeric character) or "8" (numeric character). For example, each data in a data group D4 is confusing in that the corresponding data indicates "8" (numeric character) or "9" (numeric character). Therefore, in the present embodiment, such confusing data as the data illustrated in FIG. 22 is excluded from learning data so as to generate the model whose layers are shallow. For example, in the present embodiment, layers of the CNN includes total four layers of two convolution layers and two fully connected layers.

In Step S431, the identification unit 14 performs character recognition using the CNN on an identification target label as follows. In other words, the identification unit 14 inputs identification target labels extracted in Step S411, S419, or S427 to the CNN one by one, and computes, as an output of the CNN, a probability [%] of a kind of each of characters having aforementioned 14 kinds. A total of the probabilities of the kinds of characters having aforementioned 14 kinds is assumed to be 100%. The identification unit 14 employs a character, among the kinds of characters having aforementioned 14 kinds, whose probability exceeds 50% as a recognized result. For example, when an output of the CNN in response to an identification target label input to the CNN has a probability 70% with respect to "1" (numeric character), a probability 10% with respect to "7" (numeric character), a probability 20% with respect to "/" (delimiter character), and a probability 0% with respect to other characters, the identification unit 14 employs "1" (numeric character) as a result of character recognition for the identification target label input to the CNN, and increments a recognition count of "1" (numeric character). For example, when an output of the CNN in response to an identification target label input to the CNN has a probability 60% with respect to "3" (numeric character), a probability 5% with respect to "8" (numeric character), a probability 35% with respect to "9" (numeric character), and a probability 0% with respect to other characters, the identification unit 14 employs "3" (numeric character) as a result of character recognition for the identification target label input to the CNN, and increments a recognition count of "3" (numeric character). Such an increment in a recognition count of each character is performed, for each of the identification target labels, on a plurality of identification target labels existing at positions different form one another in the target area data.

Returning to FIG. 21, in Step S433, the controller 17 next determines whether or not a value of the number-of-processes counter "i" exceeds the specified process count "a". When the value of the number-of-processes counter "i" is the specified process count "a" or less (Step S433: No), the process is returned to Step S403. Therefore, when the kind-of-font counter "n" is "0", processes of Steps S407 to S411, and S431 are repeatedly executed for 56 times. When the kind-of-font counter "n" is "2", Steps S423 to S427, and S431 are repeatedly executed for 56 times. In other words, when a kind of a font is "colored font" of the colored DSEG font or the colored non-DSEG font, the binarizing process (Steps S407 and S423) by the binarizing unit 13 and the removing process (Steps S411 and S427) by the identification unit 14 are repeatedly executed for two or more times.

On the other hand, when a value of the number-of-processes counter "i" exceeds the specified process count "a" (Step S433: Yes), the process is shifted to Step S435.

In Step S435, the identification unit 14 performs a "lump identification". The identification unit 14 performs the lump identification on the basis of the recognized result in Step S431 as follows.

In other words, for example, five (first to fifth) identification target labels are assumed to be included in the target area data. When the kind-of-font counter "n" is "0" or "2", the identification unit 14 determines a combination of recognized results of the first to fifth identification target labels for each of the 56 binarizing slices, and tallies determination counts of the combinations of the recognized results for each of the combinations over the 56 character recognitions so as to perform the lump identification. In other words, the identification unit 14 employs a combination having the largest determination count among the determination counts tallied for each of the combinations over the 56 character recognitions as an identified result for the first to fifth identification target labels. This is because a combination having the largest determination count is a combination whose probability is the largest. Herein, the identification unit 14 determines the combination of the recognized results of the identification target labels only when four or more identification target labels are included in the target area data at each binarizing slice.

For example, it is assumed that, when the binarizing slices are "38", "138", and "210" in the character recognition of Step S431, a first identification target label is recognized to be "8", a second identification target label is recognized to be "8", a third identification target label is recognized to be "6", a fourth identification target label is recognized to be "3", and a fifth identification target label is recognized to be "0". It is assumed that, when the binarizing slices are "86" and "178", in the character recognition Step S431, a first identification target label is recognized to be "9", a second identification target label is recognized to be "8", a third identification target label is recognized to be "6", a fourth identification target label is recognized to be "3", and a fifth identification target label is recognized to be "0". It is assumed that, when the binarizing slice is "98", in the character recognition of Step S431, a first identification target label is recognized to be "8", a second identification target label is recognized to be "8", a third identification target label is recognized to be "5", a fourth identification target label is recognized to be "3", and a fifth identification target label is recognized to be "0". It is assumed that, when the binarizing slice is 222, in the character recognition of Step S431, a first identification target label is recognized to be "3", a second identification target label is recognized to be "8", a third identification target label is recognized to be "5", a fourth identification target label is recognized to be "3", and a fifth identification target label is recognized to be "0". The determination counts of combinations of recognized results of the first to the fifth identification target labels are "3" with respect to "88630" that is the first combination, "2" with respect to "98630" that is the second combination, "1" with respect to "88530" that is the third combination, and "1" with respect to "38530" that is the fourth combination. Therefore, the identification unit 14 employs the character string "88630" (first combination) whose determination count is the largest as an ultimate identified result of the lump identification. This identified result of "88630" obtained by the lump identification is appropriate as an identified result of a date of the DSEG font illustrated in FIG. 5.

For example, it is assumed that, when the binarizing slices are "38", "138", and "210" in the character recognition of Step S431, a first identification target label is recognized to be "3", a second identification target label is recognized to be "8", a third identification target label is recognized to be "6", a fourth identification target label is recognized to be "3", and a fifth identification target label is recognized to be "0". It is assumed that, when the binarizing slices are "86" and "178", in the character recognition of Step S431, a first identification target label is recognized to be "9", a second identification target label is recognized to be "8", a third identification target label is recognized to be "6", a fourth identification target label is recognized to be "3", and a fifth identification target label is recognized to be "0". It is assumed that, when the binarizing slice is 98, in the character recognition of Step S431, a first identification target label is recognized to be "8", a second identification target label is recognized to be "8", a third identification target label is recognized to be "5", a fourth identification target label is recognized to be "3", and a fifth identification target label is recognized to be "0". It is assumed that, when the binarizing slice is 222, in the character recognition of Step S431, a first identification target label is recognized to be "8", a second identification target label is recognized to be "8", a third identification target label is recognized to be "6", a fourth identification target label is recognized to be "3", and a fifth identification target label is recognized to be "0". The determination counts of combinations of recognized results of the first to the fifth identification target labels are "3" with respect to "38630" that is the first combination, "2" with respect to "98630" that is the second combination, "1" with respect to "88530" that is the third combination, and "1" with respect to "88630" that is the fourth combination. Therefore, the identification unit 14 employs the character string "38630" (first combination) whose determination count is the largest as an ultimate identified result of the lump identification. This identified result of "38630" obtained by the lump identification is not appropriate as an identified result of the date of the DSEG font illustrated in FIG. 5.

When the kind-of-font counter "n" is "1", the identification unit 14 employs, as an ultimate identified result of the lump identification, a combination of identification target labels recognized in character recognition that is performed, in Step S431, only once on each of the first to the fifth identification target labels.

So far, the lump identification of Step S435 has been explained. Thus, in Step S435, the identification unit 14 identifies in a lump all of the identification target labels included in the target area data. In other words, the identification unit 14 identifies in a lump a character string included in the date area data as described above.

Next, in Step S437, the identification unit 14 determines whether or not the lump identification of Step S435 is successful. In Step S437, when no character string having four or more digits is identified in any of the binarizing slices by the lump identification, the identification unit 14 determines that the lump identification is failed, on the other hand, when a character string having four or more digits identified in any of the binarizing slices by the lump identification, the identification unit 14 determines that the lump identification is successful. When the kind-of-font counter "n" is "0" or "2", the number of all of the binarizing slices is 56, and when the kind-of-font counter "n" is "1", the number of all of the binarizing slices is one.

When the lump identification is successful (Step S437: Yes), the process is shifted to Step S213 illustrated in FIG. 2, and when the lump identification is failed (Step S437: No), the process is shifted to Step S439. In other words, when identification of a character string by the lump identification of Step S435 is difficult (Step S437: No), the identification unit 14 performs an individual identification of Step S439.

In Step S439, the identification unit 14 performs the "individual identification". The identification unit 14 performs the individual identification on the basis of the recognized result of Step S431 as follows.

In other words, for example, the target area data assumed to include five (first to fifth) identification target labels. When the kind-of-font counter "n" is "0" or "2", the identification unit 14 individually tallies recognition counts for each of the first to the fifth identification target labels over 56 character recognitions so as to perform the individual identification. In other words, the identification unit 14 individually employs, as an identified result, a character whose recognition count is the largest over 56 character recognitions for each of the first to the fifth identification target labels. This because a character whose recognition count is the largest is a character whose probability is the largest. Herein, the identification unit 14 performs the individual identification on the identification target labels only when four or more identification target labels are included in the target area data at each binarizing slice.

For example, it is assumed that, in 56 character recognitions of the first identification target label among the first to the fifth identification target labels, "8" is recognized for six times, "9" is recognized for one time, and "3" is recognized for one time. Therefore, the identification unit 14 employs "8" as an identified result for the first identification target label in the individual identification. It is assumed that, in 56 character recognitions of the second identification target label, "8" is recognized for nine times and "3" is recognized for two times. Therefore, the identification unit 14 employs "8" as an identified result for the second identification target label in the individual identification. It is assumed that, in 56 character recognitions of the third identification target label, "6" is recognized for seven times and "5" is recognized for two times. Therefore, the identification unit 14 employs "6" as an identified result for the third identification target label in the individual identification. It is assumed that, in 56 character recognitions of the fourth identification target label, "3" is recognized for nine times. Therefore, the identification unit 14 employs "3" as an identified result for the fourth identification target label in the individual identification. It is assumed that, in 56 character recognitions of the fifth identification target label, "0" is recognized for nine times and "8" is recognized for four times. Therefore, the identification unit 14 employs "0" as an identified result for the fifth identification target label in the individual identification. Thus, the identification unit 14 employs, as an ultimate identified result of the individual identification, a character string "88630" obtained by combining "8", "8", "6", "3", and "0" that are identified results of the respective individual identifications. This identified result of "88630" obtained by the individual identification is appropriate as an identified result of the date of the DSEG font illustrated in FIG. 5.

For example, it is assumed that, in 56 character recognitions of the first identification target label among the first to the fifth identification target labels, "3" is recognized for six times, "9" is recognized for one time, and "8" is recognized for one time. Therefore, the identification unit 14 employs "3" as an identified result for the first identification target label in the individual identification. It is assumed that, in 56 character recognitions of the second identification target label, "8" is recognized for nine times and "3" is recognized for two times. Therefore, the identification unit 14 employs "8" as an identified result for the second identification target label in the individual identification. It is assumed that, in 56 character recognitions of the third identification target label, "6" is recognized for seven times and "5" is recognized for two times. Therefore, the identification unit 14 employs "6" as an identified result for the third identification target label in the individual identification. It is assumed that, in 56 character recognitions of the fourth identification target label, "3" recognized for nine times. Therefore, the identification unit 14 employs "3" as an identified result for the fourth identification target label in the individual identification. It is assumed that, in 56 character recognitions of the fifth identification target label, "0" is recognized for nine times and "8" is recognized for four times. Therefore, the identification unit 14 employs "0" as an identified result for the fifth identification target label in the individual identification. Thus, the identification unit 14 employs, as an ultimate identified result of the individual identification, a character string "38630" obtained by combining "3", "8", "6", "3", and "0" that are identified results of the respective individual identifications. This identified result of "38630" obtained by the individual identification is not appropriate as an identified result of the date of the DSEG font illustrated in FIG. 5.

When the kind-of-font counter "n" "1", the identification unit 14 employs, as an ultimate identified result of the individual identification, the recognized results of the character recognition performed only once on each of the first to the fifth identification target labels in Step S431.

So far, the individual identification of Step S439 has been explained. Thus, in Step S439, the identification unit 14 individually identifies the identification target labels included in the target area data. In other words, as described above, the identification unit 14 individually identifies each character of a character string included in the date area data.

Next, in Step S441, the identification unit 14 determines whether or not the individual identification of Step S439 is successful. In Step S439, when no character string having four or more digits is identified in any binarizing slice by the individual identification, the identification unit 14 determines that the individual identification is failed, on the other hand, when a character string having four or more digits is identified in any binarizing slice by the individual identification the identification unit 14 determines that the individual identification is successful. When the kind-of-font counter "n" "0" or "2", the number of all of the binarizing slices is 56, and, when the kind-of-font counter "n" is "1", the number of all of the binarizing slices is one.

When the individual identification is successful (Step S441: Yes), the process is shifted to Step S213 illustrated in FIG. 2, and, when the individual identification is failed (Step S441: No), the process is shifted to Step S443.

In Step S443, the controller 17 increments the kind-of-font counter "n". After the process f Step S443, the process returned to Step S209 illustrated in FIG. 2.

So far, the identifying process of Step S211 has been explained.

Figure 23:
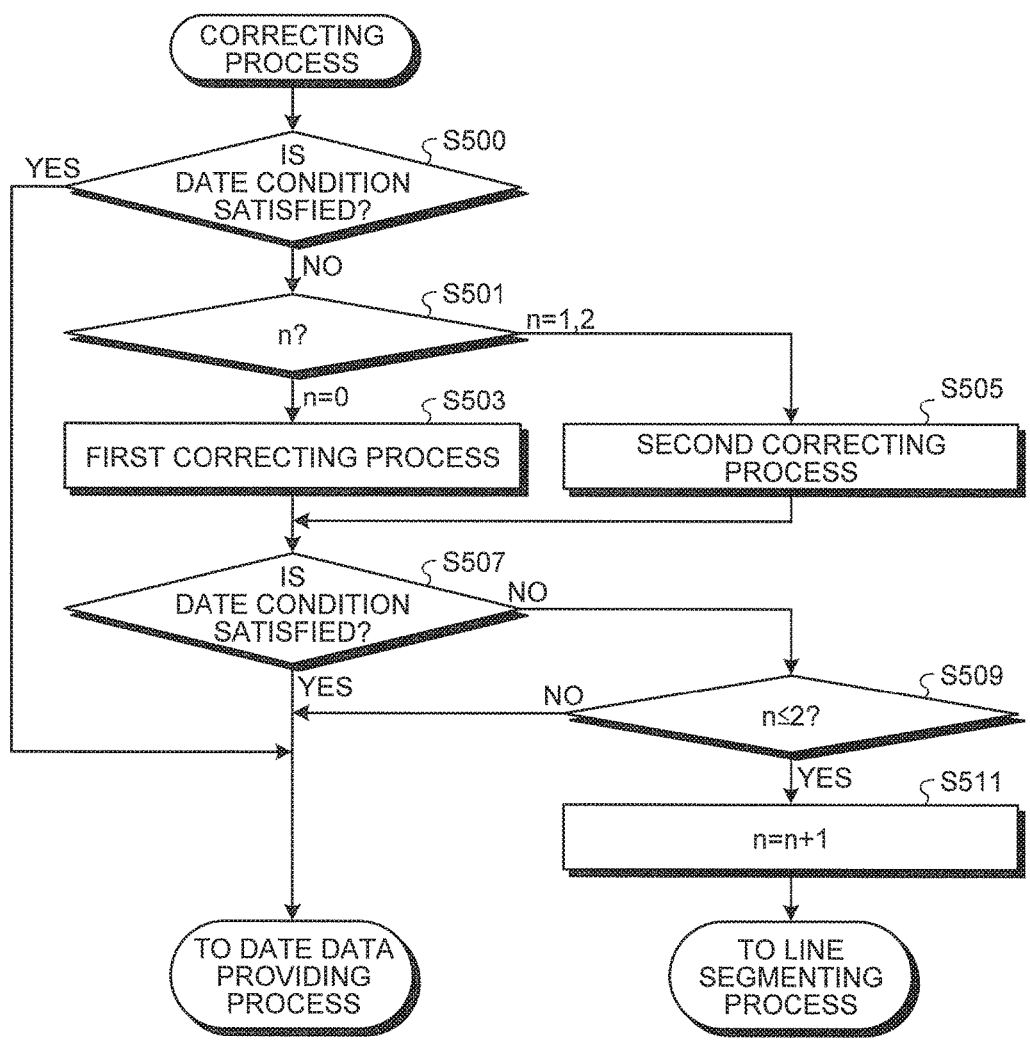
FIG. 23 is a flowchart illustrating one example of a correcting process according to the first embodiment.

Returning to FIG. 2, in Step S213, the controller next causes the correction unit 15 to execute a correcting process. In Step S213, the correction unit 15 executes a correcting process on the ultimate identified result of the lump identification of Step S435 or the ultimate identified result of the individual identification of Step S439. FIG. 23 is a flowchart illustrating one example of the correcting process according to the first embodiment.

In Step S500 illustrated in FIG. 23, the controller 17 first determines whether or not a date expressed by a character string included in an identified result satisfies a predetermined date condition. For example, the predetermined date condition is "from 1 Jan. 1950 to present date", and, when a date expressed by a character string included in an identified result corresponds to any date among dates from 1 Jan. 1950 to the present date, the controller 17 determines that this date satisfies the predetermined date condition. On the other hand, a date expressed by a character string included in an identified result does not correspond to any date among dates from 1 Jan. 1950 to the present date, the controller 17 determines that this date does not satisfy the predetermined date condition. In other words, the controller 17 determines whether or not a date expressed by a character string included in an identified result is appropriate as a date. When a date expressed by a character string included in a corrected identified result satisfies the predetermined date condition (Step S500: Yes), the process is shifted to Step S215 illustrated in FIG. 2. On the other hand, when a date expressed by a character string included in a corrected identified result does not satisfy the predetermined date condition (Step S500: No), the process is shifted to Step S501.

Therefore, for example, when the date of the DSEG font illustrated in FIG. 5 is identified as "88630" by the lump identification or the individual identification, a determination in Step S500 becomes "Yes". On the other hand, when being identified as "38630", a determination in Step S500 becomes "No".

Next, in Step S501, the controller 17 determines a value of the kind-of-font counter "n".

When the kind-of-font counter "n" is "0", in Step S503, the controller 17 causes the correction unit 15 to execute the "first correcting process". On the other hand, when the kind-of-font counter "n" is "1" or "2", in Step S505, the controller 17 causes the correction unit 15 to execute the "second correcting process". In other words, the first correcting process of Step S503 is a correcting process whose target is an identified result for the colored DSEG font, and the second correcting process of Step S505 is a correcting process whose target is an identified result for the white non-DSEG font and the colored non-DSEG font, in other words, the non-DSEG font. In other words, the correction unit 15 executes a different correcting process for an identified result between a case where a kind of a font is the DSEG font and a case where a kind of a font is other than the DSEG font.

Figure 24:
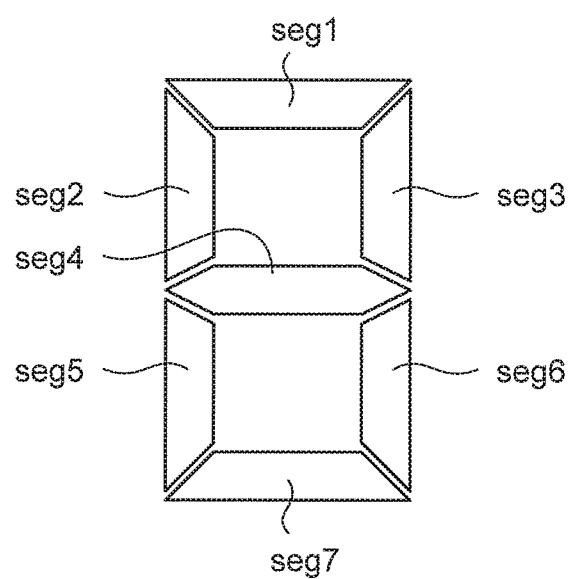
FIGS. 24 to 26 are diagrams illustrating examples of first correcting processes according to the first embodiment.
Figure 25:
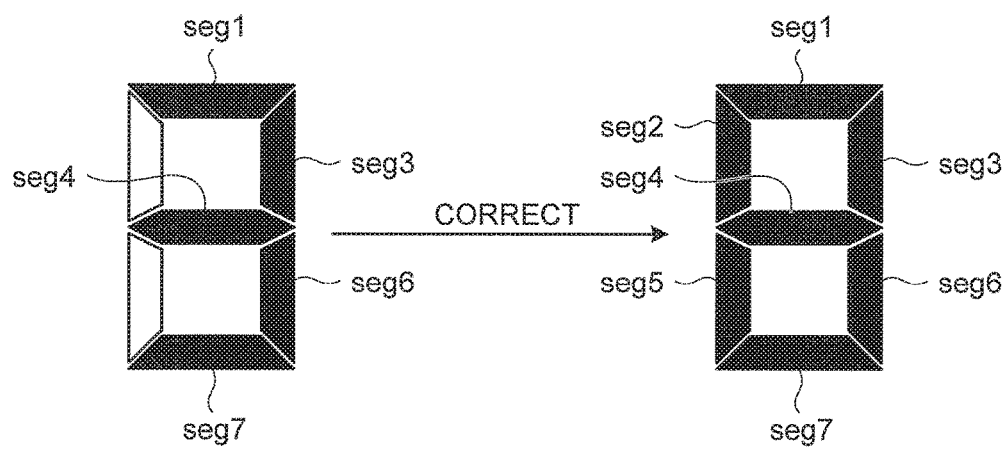
Figure 26:
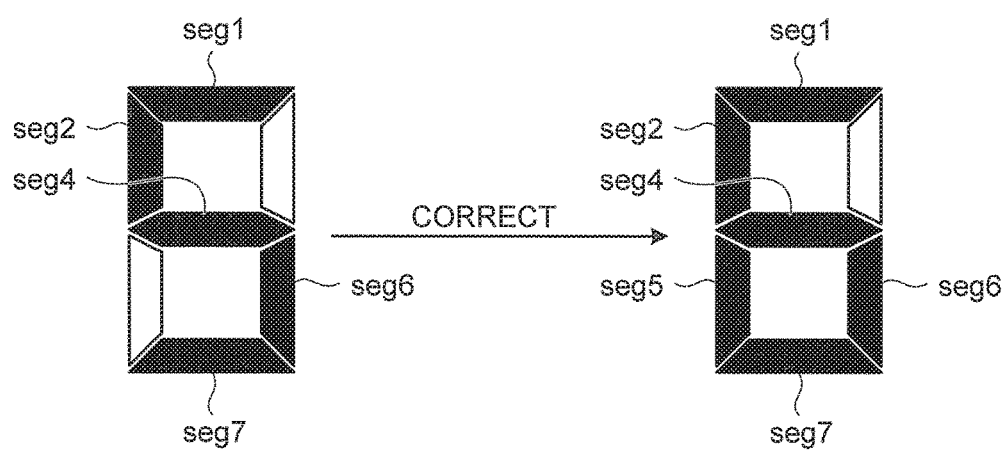

FIGS. 24 to 26 are diagrams illustrating examples of first correcting processes according to the first embodiment. When the DSEG font is seven segment font, as illustrated in FIG. 24, each of the numeric characters of "0" to "9" is constituted by using seven segments of a seg1 to a seg7. Therefore, in Step S503, for example, when "3" (numeric character) is included in an ultimate identified result obtained from the identifying process having executed by the identification unit 14, as illustrated in FIG. 25, the correction unit 15 corrects this "3" to "8" (numeric character). For example, in Step S503, when "5" (numeric character) is included in an ultimate identified result obtained from the identifying process having executed by the identification unit 14, as illustrated in FIG. 26, the correction unit 15 corrects this "5" to "6" (numeric character). As illustrated in FIG. 25, the number of segments constituting "3" (numeric character) is five, whereas the number of segments constituting "8" (numeric character) is seven. As illustrated in FIG. 26, the number of segments constituting "5" (numeric character) is five, whereas the number of segments constituting "6" (numeric character) is six. In other words, in the first correcting process that is executed when a kind of a font is the DSEG font (Step S503), the correction unit 15 executes a correcting process on an identified result on the basis of the number of segments constituting each of the numeric characters included in the identified result of the identifying process.

On the other hand, FIGS. 27 to 32 are diagrams illustrating examples of second correcting processes according to the first embodiment.

For example, as illustrated in FIG. 27, when an ultimate identified result obtained from the identifying process having executed by the identification unit 14 is "2002/08112", the correction unit 15 first detects "/" (delimiter character) at a position P5 that is the fifth digit from the most left digit. In a case of detecting "/" (delimiter character) at the position P5 that is the fifth digit from the most left digit, as illustrated in FIG. 27, when there exists "1" (numeric character) at a position P8 that is the eighth digit from the most left digit, the correction unit 15 corrects this "1" (numeric character) to "/" (delimiter character).

For example, as illustrated in FIG. 28, when an ultimate identified result obtained from the identifying process having executed by the identification unit 14 is "2002/08712", the correction unit 15 first detects "/" (delimiter character) at the position P5 that is the fifth digit from the most left digit. In a case of detecting "/" (delimiter character) at the position P5 that is the fifth digit from the most left digit, as illustrated in FIG. 28, when there exists "7" (numeric character) at a position P8 that is the eighth digit from the most left digit, the correction unit 15 corrects this "7" (numeric character) to "/" (delimiter character).

For example, as illustrated in FIG. 29, when an ultimate identified result obtained from the identifying process having executed by the identification unit 14 is "2002108112", the correction unit 15 first detects "1" (numeric character) at the position P5 that is the fifth digit and at the position P8 that is the eighth digit from the most left digit. When detecting "1" (numeric character) at the position P5 that is the fifth digit and at the position P8 that is the eighth digit from the most left digit, as illustrated in FIG. 29, the correction unit 15 corrects "1" (numeric character) existing at the position P5 that is the fifth, digit and at the position P8 that is the eighth digit from the most left digit to "/" (delimiter character).

For example, as illustrated in FIG. 30, when an ultimate identified result obtained from the identifying process having executed by the identification unit 14 is "0045月248", the correction unit 15 first detects "月" (delimiter character) at a position P5 that is the fifth digit from the most left digit. In a case of detecting "月" (delimiter character) at a position P5 that is the fifth digit from the most left digit, as illustrated in FIG. 30, when there exists "4" (numeric character) at a position P3 that is a third digit from the most left digit, the correction unit 15 corrects this "4" (numeric character) to "年" (delimiter character), and when there exists "8" (numeric character) at the position P8 that is the eighth digit from the most left digit, the correction unit 15 corrects this "8" (numeric character) to "日" (delimiter character).

Figures 31, 32, 33:
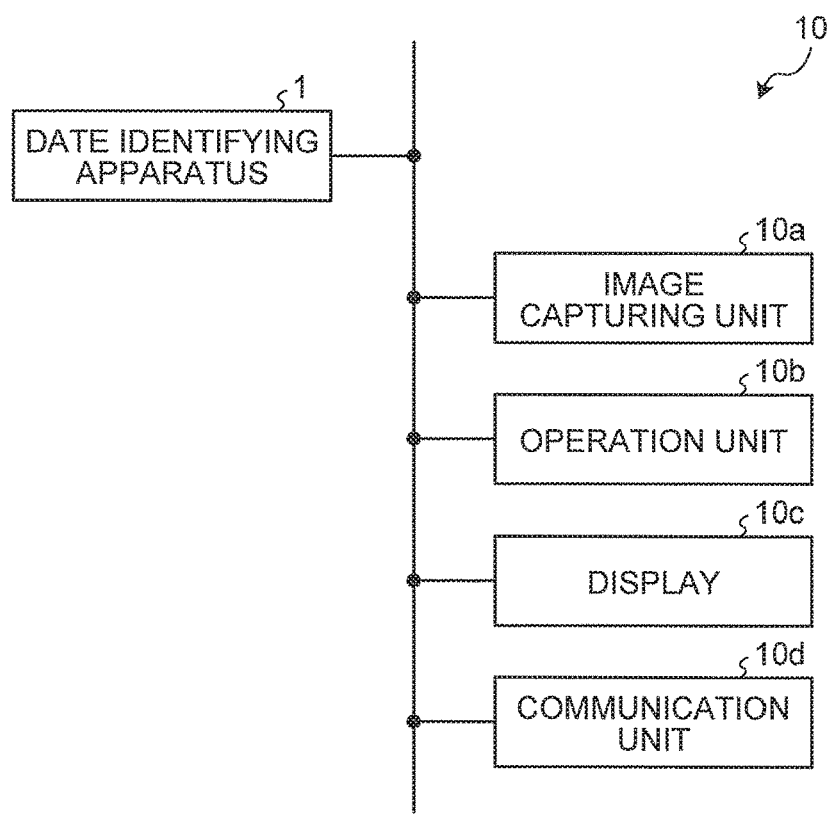

For example, as illustrated in FIG. 31, when an ultimate identified result obtained from the identifying process having executed by the identification unit 14 is "00年58248", the correction unit 15 first detects "年" (delimiter character) at the position P3 that is the third digit from the most left digit. In a case of detecting "年" (delimiter character) at the position P3 that is the third digit from the most left digit, as illustrated in FIG. 31, when there exists "8" (numeric character) at the position P5 that is the fifth digit from the most left digit, the correction unit 15 corrects this "8" (numeric character) to "月" (delimiter character), and, when there exists "8" (numeric character) at the position P8 that is the eighth digit from the most left digit, the correction unit 15 corrects this "8" (numeric character) to "日" (delimiter character).

For example, as illustrated in FIG. 32, when an ultimate identified result obtained from the identifying process having executed by the identification unit 14 is "0045824日", the correction unit 15 first detect "日" (delimiter character) at the position P8 that is the eighth digit from the most left digit. In a case of detecting "日" (delimiter character) at the position P8 that is the eighth digit from the most left digit, as illustrated in FIG. 32, when there exists "4" (numeric character) at the position P3 that is the third digit from the most left digit, the correction unit 15 corrects this "4" (numeric character) to "年" (delimiter character), and, when there exists "8" (numeric character) at the position P5 that is the fifth digit from the most left digit, the correction unit 15 corrects this "8" (numeric character) to "月" (delimiter character).

In other words, in the second correcting process (Step S505) that is executed in a case where a kind of a font is other than the DSEG font (namely, non-DSEG font), the correction unit 15 executes the correcting process on the identified result on the basis of a positional relation between characters included in the identified result obtained from the identifying process.

So far, the first and the second correcting processes have been explained.

Returning to FIG. 23, after the process of Step S503 or S505, the process is shifted to Step S507.

In Step S507, the controller 17 determines whether or not a date expressed by a character string included in a corrected identified result satisfies the predetermined date condition. The determination method thereof is similarly to that of Step S500. When the date expressed by the character string included in the corrected identified result satisfies the predetermined date condition (Step S507: Yes), the process is shifted to Step S215 illustrated in FIG. 2. On the other hand, when the date expressed by the character string included in the corrected identified result does not satisfy the predetermined date condition (Step S507: No), the process is shifted Step S509.

In Step S509, the controller 17 determines whether or not the kind-of-font counter "n" is "2" or less. When the kind-of-font counter "n" is "3" or more, in other words, when a date identifying process for all of the kinds (first to third kinds) of fonts is completed (Step S509: No), the process is shifted to Step S215 illustrated in FIG. 2. On the other hand, when the kind-of-font counter "n" is "2" or less, in other words, when a date identifying process for kinds of fonts up to the third kind within the first to the third kinds is not completed (Step S509: Yes), the process is shifted to Step S511.

In Step S511, the controller 17 increments the kind-of-font counter "n". After the process of Step S511, the process is shifted to Step S209 illustrated in FIG. 2.

Returning to FIG. 2, in Step S215, the controller 17 causes the provision unit 16 to execute a date data providing process. In Step S215, the provision unit 16 acquires input image data from the memory 11, and provides date data constituting a date expressed by a character string included in a corrected identified result to the input image data acquired from the memory 11. The provision unit 16 outputs, as output image data, the input image data, to which the date data is provided, from the date identifying apparatus 1.

As described above, in the first embodiment, the date identifying apparatus 1 includes the segmenting unit 12, the binarizing unit 13, the identification unit 14, the correction unit 15, and the provision unit 16. The segmenting unit 12 segments date area data from input image data. The binarizing unit 13 executes a binarizing process that binarizes the date area data to generate binarized data. The identification unit 14 executes an identifying process that executes a recognizing process using the deep learning on the binarized data so as to identify a character string included in the date area data. The correction unit 15 executes, on an identified result of the identifying process, a correcting process in accordance with a kind of a font of the character string included in the date area data. The provision unit 16 provides, to the image data, date data based on a character string included in the corrected identified result.

Thus, even when a learning degree of the deep learning is low and thus the recognition accuracy for character string is low, a date identifying accuracy can be improved by a correcting process according to a kind of a font. In other words, because the date identifying accuracy can be improved by the correcting process according to a kind of a font, layers of a CNN that is one kind of the deep learning can be shallow, and thus a computation amount can be reduced. Thus, a date provided to a medium such as a photograph can be identified with high accuracy by using a less process amount.

The correction unit 15 changes a correcting process between a case where a kind of a font is the DSEG font and a kind of a font is a font (namely, non-DSEG font) other than the DSEG font.

Thus, a correcting process according to characteristics of each of the DSEG font and the non-DESG font can be executed, and thus the correction accuracy can be improved.

When a kind of a font is the DSEG font, the correction unit 15 executes a correcting process on the basis of the number of segments constituting each numeric character included in the identified result of the identifying process.

Thus, a numeric character of the DSEG font, whose recognition error is easy to occur, can be preferentially corrected.

When a kind of a font is the non-DSEG font, the correction unit 15 executes a correcting process on the basis of a positional relation between characters included in the identified result.

Thus, a numeric character of the non-DSEG font, whose recognition error is easy to occur, can be preferentially corrected.

The binarizing unit 13 and the identification unit 14 execute a binarizing process and a recognizing process for a plurality of times, the identification unit 14 identifies a character string on the basis of an identified result whose probability is the largest.

Thus, furthermore, an identification accuracy of a date can be improved.

When a plurality of characters included in a character string is difficult to be identified in a lump by using the lump identification, the identification unit 14 individually identifies each of the characters by using the individual identification.

Thus, for the first time when identification using the lump identification is difficult, an individual identification having the high process amount and the high identification accuracy compared with the lump identification is performed, and thus the identification accuracy can be improved while minimizing the process amount.

[b] Second Embodiment

FIG. 33 is a diagram illustrating a configuration example of a mobile terminal according to a second embodiment. In FIG. 33, a mobile terminal 10 includes the date identifying apparatus 1, an image capturing unit 10a, an operation unit 10b, a display 10c, and a communication unit 10d. The mobile terminal 10 is a smart device such as a smartphone and a tablet terminal. The image capturing unit 10a is realized by, for example, a camera as hardware. The operation unit 10b and the display 10c are realized by, for example, a touch panel as hardware. The communication unit 10d is realized by, for example, a wireless communication module or a network interface module as hardware.

In the mobile terminal 10, for example, data of an image captured by the image capturing unit 10a and data of an image received by the communication unit 10d are input image data to the date identifying apparatus 1.

Other Embodiments

[1] When an aspect ratio of a lateral length to a vertical length of the label area 116 in an identification target label is 1:3 or more in the character recognition of Step S431, the identification unit 14 may employ "1" (numeric character) as a result of the character recognition for the identification target label without performing the character recognition by the CNN.

[2] The correction unit 15 may execute the first correcting process on an identified result by the lump identification only when there exists a plurality of combinations whose determination counts are the same. For example, when, in the lump identification, determination counts of combinations of recognized results of the aforementioned first to fifth identification target labels are 4 with respect to "88613" (first combination), 4 with respect to "88618" (second combination), 2 with respect to "88530" (third combination), and 1 with respect to "88630" (fourth combination), the correction unit 15 may execute the first correcting process between the first and the second combinations whose determination counts are the same as four so as to employ "88618" as the identified result of the lump identification.

[3] The correction unit 15 may execute the first correcting process on an identified result of an individual identification only when there exists a plurality of numeric characters whose recognition counts are the same for one identification target label. For example, when a first identification target label among the aforementioned first to the fifth identification target labels is recognized "3" for five times, recognized "8" for five times, and recognized "9" for one time in 56 character recognitions, the correction unit 15 may execute the first correcting process between "3" and "8" whose recognition counts are the same as 5 so as to employ "8" as an identified result of the individual identification of the first identification target label.

[4] In the second labelling process (Step S313 or S319) according to the first embodiment, the second adjacency integration is not performed. However, the second adjacency integration may be performed in the second labelling process. When performing the second adjacency integration in the second labelling process, it is preferable that a value of the threshold THD to be used for the second adjacency integration is smaller than that of the second adjacency integration in the second labelling process.

[5] The value of the specified process count "a" may be set on the basis of a background color of the date area data 101. When, for example, pictures and the like are imaged in a background and the background color is complicated, it is preferable that a value of the specified process count "a" may be increased.

[6] The deep learning used for the character recognition of Step S431 is not limited to the CNN. For example, the character recognition of Step S431 may be performed by using the deep learning such as a Recurrent Neural Network (RNN) and a Long Short-Term Memory (LSTM).

[7] Whole or a part of each process in the aforementioned explanation of the date identifying apparatus 1 may be realized by causing a processor included in the date identifying apparatus 1 to execute a program corresponding to the corresponding process. For example, a memory may memorize a program corresponding to each process in the aforementioned explanation, and a processor may read and execute the program. The program may be memorized in a program server that is connected to the mobile terminal 10 through an arbitrary network, and may be downloaded and executed by the mobile terminal 10 from this program server, may be memorized in a record medium being readable by the mobile terminal 10, and may be read and executed from this record medium. The record medium being readable by the mobile terminal 10 may include a portable memory medium such as a memory card, a Universal Serial Bus memory (USE memory), a Secure Digital card (SD card), a flexible disk, a magnet-optical disk, a Compact Disc Read Only Memory (CD-ROM), a Digital Versatile Disc (DVD), and a Blu-ray disk (registered trademark). The program is a data processing method described by using an arbitrary language or an arbitrary description method, and any format such as a source code and a binary code may be used. The program is not limited to that singly configured, but may include that dispersedly configured as a plurality of modules or a plurality of libraries, or may include that achieves functions thereof by cooperating with a separated program represented by an Operating System (OS).

[8] Specific forms of distribution and integration of the date identifying apparatus 1 are not limited to those illustrated in the drawings, and all or some of the date identifying apparatus 1 can be configured by separating or integrating the apparatus functionally or physically in any unit, according to various types of loads, the status of use, etc.

According to one aspect of the embodiments, a date provided to a medium, such as a photograph, can be identified with high accuracy.

All examples and conditional language recited herein are intended for pedagogical purposes of aiding the reader in understanding the present disclosure and the concepts contributed by the inventor to further the art, and are not to be construed as limitations to such specifically recited examples and conditions, nor does the organization of such examples in the specification relate to a showing of the superiority and inferiority of the present disclosure. Although the embodiments of the present disclosure have been described in detail, it should be understood that the various changes, substitutions, and alterations could be made hereto without departing from the spirit and scope of the present disclosure.

What is claimed is:
1. A date identifying apparatus comprising:
a memory storing a program; and
a processor coupled to the memory, wherein
when the program is executed by the processor, the processor is configured to:
segment date area data, the date area data being data of an area to which a date is estimated to be provided, from image data generated by capturing a medium to which the date is provided;
execute a binarizing process for binarizing the date area data to generate binarized data;
execute an identifying process for executing a recognizing process using deep learning on the binarized data to identify a character string included in the date area data;
execute a correcting process according to a kind of a font of the character string on an identified result of the identifying process; and provide, to the image data, date data based on the corrected character string included in the corrected identified result, when the kind of the font is a Data SEGment (DSEG) font, the processor executes the correcting process based on a number of segments constituting each numeric character included in the identified result, and when the kind of the font is the font other than the DSEG font, the processor executes the correcting process based on a positional relation between characters included in the identified result.

2. The date identifying apparatus according to claim 1, wherein, the processor:

respectively executes the binarizing process and the recognizing process for a plurality of times, and identifies the character string based on the identified result having a largest probability.

3. The date identifying apparatus according to claim 1, wherein, when identifying in a lump a plurality of characters included in the character string is difficult, the processor individually identifies each of the plurality of characters.

4. A date identifying method comprising:

segmenting date area data, the date area data being data of an area to which a date is estimated to be provided, from image data generated by capturing a medium to which the date is provided;

generating binarized data by binarizing the date area data;

executing an identifying process for executing a recognizing process using deep learning on the binarized data to identify a character string included in the date area data;

correcting an identified result of the identifying process in accordance with a kind of a font of the character string; and providing, to the image data, date data based on the corrected character string included in the corrected identified result, wherein, when the kind of the font is a Data SEGment (DSEG) font, correcting the identified result based on a number of segments constituting each numeric character included in the identified result, and when the kind of the font is the font other than the DSEG font, correcting the identified result based on a positional relation between characters included in the identified result.

5. A non-transitory computer readable recording medium having stored therein a date identifying program, the date identifying program causing a processor to execute a process comprising:

segmenting date area data, the date area data being data of an area to which a date is estimated to be provided, from image data generated by capturing a medium to which the date is provided;

generating binarized data by binarizing the date area data;

executing an identifying process for executing a recognizing process using deep learning on the binarized data to identify a character string included in the date area data;

correcting an identified result of the identifying process in accordance with a kind of a font of the character string; and providing, to the image data, date data based on the corrected character string included in the corrected identified result, wherein, when the kind of the font is a Data SEGment (DSEG) font, correcting the identified result based on a number of segments constituting each numeric character included in the identified result, and when the kind of the font is the font other than the DSEG font, correcting the identified result based on a positional relation between characters included in the identified result.

* * * * *